(12) United States Patent
Fukuda et al.

(10) Patent No.: US 12,741,482 B2
(45) Date of Patent: Sep. 22, 2026

(54) DECORATIVE SHEET, DECORATIVE-SHEET-ATTACHED DISPLAY DEVICE, SHEET ARTICLE, AND METHOD OF MANUFACTURING DECORATIVE SHEET

(71) Applicant: DAI NIPPON PRINTING CO., LTD., Tokyo-to (JP)

(72) Inventors: Shunji Fukuda, Tokyo-to (JP); Shinya Yoda, Tokyo-to (JP); Tsubasa Takakura, Tokyo-to (JP); Youhei Kakuba, Tokyo-to (JP); Hiroyuki Kuniyasu, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 170 days.

(21) Appl. No.: 18/281,100

(22) PCT Filed: Mar. 9, 2022

(86) PCT No.: PCT/JP2022/010421

§ 371 (c)(1),
(2) Date: Sep. 8, 2023

(87) PCT Pub. No.: WO2022/191257

PCT Pub. Date: Sep. 15, 2022

(65) Prior Publication Data

US 2024/0294034 A1 Sep. 5, 2024

(30) Foreign Application Priority Data

Mar. 9, 2021 (JP) ................................ 2021-037766

(51) Int. Cl.
*B44F 1/06* (2006.01)
*B44C 1/22* (2006.01)

(Continued)

(52) U.S. Cl.
CPC ................ *B44F 1/06* (2013.01); *B44C 1/228* (2013.01); *B44F 9/00* (2013.01); *B60K 35/21* (2024.01);

(Continued)

(58) Field of Classification Search
CPC ........................................................ B44F 1/06
See application file for complete search history.

(56) References Cited

U.S. PATENT DOCUMENTS 10,529,256 B2 1/2020 Mase
2017/0334293 A1 11/2017 Kawamoto et al.

FOREIGN PATENT DOCUMENTS

JP 2001-331132 A 11/2001
JP 2012-083589 A 4/2012

(Continued)

OTHER PUBLICATIONS

Feb. 3, 2025 extended Search Report issued in European Patent Application No. 22767211.0.

(Continued)

*Primary Examiner* — Ian A Rummel
(74) *Attorney, Agent, or Firm* — Oliff PLC

(57) ABSTRACT

A decorative sheet includes a decorative layer. Holes arranged in a plurality of directions are provided in the decorative layer. An average of values of an array pitch of holes arranged in a first array direction, in which the array pitch has a least value among the plurality of directions, and a standard deviation thereof, and an average of values of an array pitch of holes arranged in a second array direction, in which the array pitch has a second least value among the plurality of directions, and a standard deviation thereof, meet particular conditions.

15 Claims, 12 Drawing Sheets

(51) Int. Cl.

| | |
|---|---|
| ***B44F 9/00*** | (2006.01) |
| ***B60K 35/21*** | (2024.01) |
| ***B60K 35/80*** | (2024.01) |
| ***G02F 1/1335*** | (2006.01) |

(52) U.S. Cl.
CPC ........ *B60K 35/80* (2024.01); *G02F 1/133512* (2013.01)

(56) References Cited

FOREIGN PATENT DOCUMENTS

| | | | | |
|---|---|---|---|---|
| JP | 2012-163951 | A | | 8/2012 |
| JP | 5688573 | B2 | | 3/2015 |
| JP | 2018173561 | A | * | 11/2018 |
| JP | 2020-163834 | A | | 10/2020 |
| JP | 7173427 | B1 | | 11/2022 |
| WO | 2020/040195 | A1 | | 2/2020 |

OTHER PUBLICATIONS

Sep. 12, 2023 International Preliminary Report on Patentability issued in International Patent Application No. PCT/JP2022/010421.
Jan. 9, 2026 Office Action issued in Japanese Application No. 2022-175722.
Abstract of JP 2012-083589.
Abstract of JP 2020-163834.
Jun. 12, 2026 Office Action issued in Japanese Application No. 2022-175722.

* cited by examiner

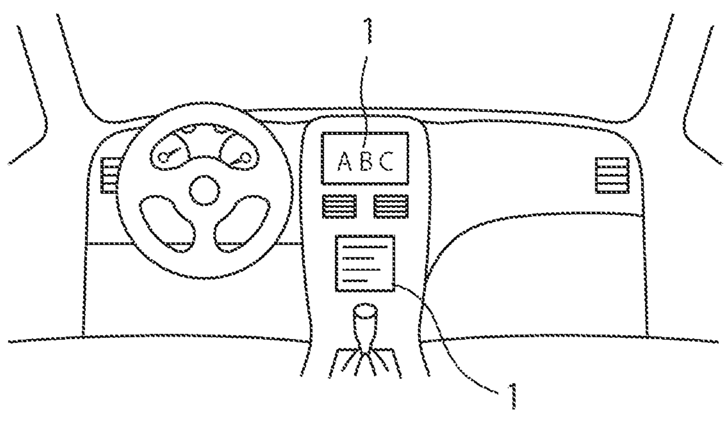
FIG. 3A
FIG. 3B
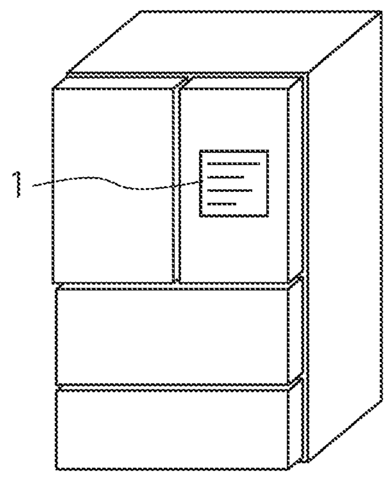
FIG. 3C

DECORATIVE SHEET, DECORATIVE-SHEET-ATTACHED DISPLAY DEVICE, SHEET ARTICLE, AND METHOD OF MANUFACTURING DECORATIVE SHEET

TECHNICAL FIELD

The present disclosure relates to a decorative sheet, a decorative-sheet-attached display device, a sheet article, and a method of manufacturing a decorative sheet.

BACKGROUND ART

A decorative sheet disposed to be stacked with a display device is known. A decorative sheet disclosed in JP2001-331132A includes a decorative layer that is designed decoratively. In the decorative layer designed decoratively, many micro-holes through which image light coming from a display device can pass are provided. The decorative sheet disclosed in JP2001-331132A hides the display device that is in a non-display state and imparts design property thereto. On the other hand, an image displayed by the display device is viewable through the decorative sheet.

However, in related art, a fringe pattern was sometimes visually noticed when viewing an image of a display device through a decorative sheet. That is, in related art, a fringe pattern was sometimes visually noticed when the display device is in a display state. The fringe pattern does not have any relevance to a design presented visually by the decorative sheet nor any relevance to an image displayed by the display device. The fringe pattern includes a plurality of streaks arranged at a pitch visible with the naked eye. Each of the streaks extends linearly in a direction intersecting with the array direction.

SUMMARY OF INVENTION

An object of the present disclosure is to suppress the occurrence of a fringe pattern.

A decorative sheet according to one embodiment includes: a decorative layer that visually presents a design, wherein holes arranged in a plurality of directions are provided in the decorative layer, an average $A_{A1}$ of values of an array pitch of the holes arranged in a first array direction, in which said average of the values of the array pitch of the holes is a least value among the plurality of directions, is 40 μm or greater and 400 μm or less, a value obtained by multiplying, by three, a standard deviation $\sigma_{A1}$ of the array pitch of the holes arranged in the first array direction is 20 μm or less, a ratio of the standard deviation $\sigma_{A1}$ (μm) to the average $A_{A1}$ (μm) is 0.0060 or greater, an average $A_{A2}$ of values of an array pitch of the holes arranged in a second array direction, in which said average of the values of the array pitch of the holes is a second least value among the plurality of directions, is 40 μm or greater and 400 μm or less, a value obtained by multiplying, by three, a standard deviation $\sigma_{A2}$ of the array pitch of the holes arranged in the second array direction is 20 μm or less, and a ratio of the standard deviation $\sigma_{A2}$ (μm) to the average $A_{A2}$ (μm) is 0.0060 or greater.

The present disclosure makes it possible to suppress the occurrence of a fringe pattern.

BRIEF DESCRIPTION OF DRAWINGS

FIG. 3A is a diagram illustrating an application example of the decorative-sheet-attached display device illustrated in FIG. 1.

FIG. 3B is a diagram illustrating an application example of the decorative-sheet-attached display device illustrated in FIG. 1.

FIG. 3C is a diagram illustrating an application example of the decorative-sheet-attached display device illustrated in FIG. 1.

DESCRIPTION OF EMBODIMENTS

Figures 1, 2:
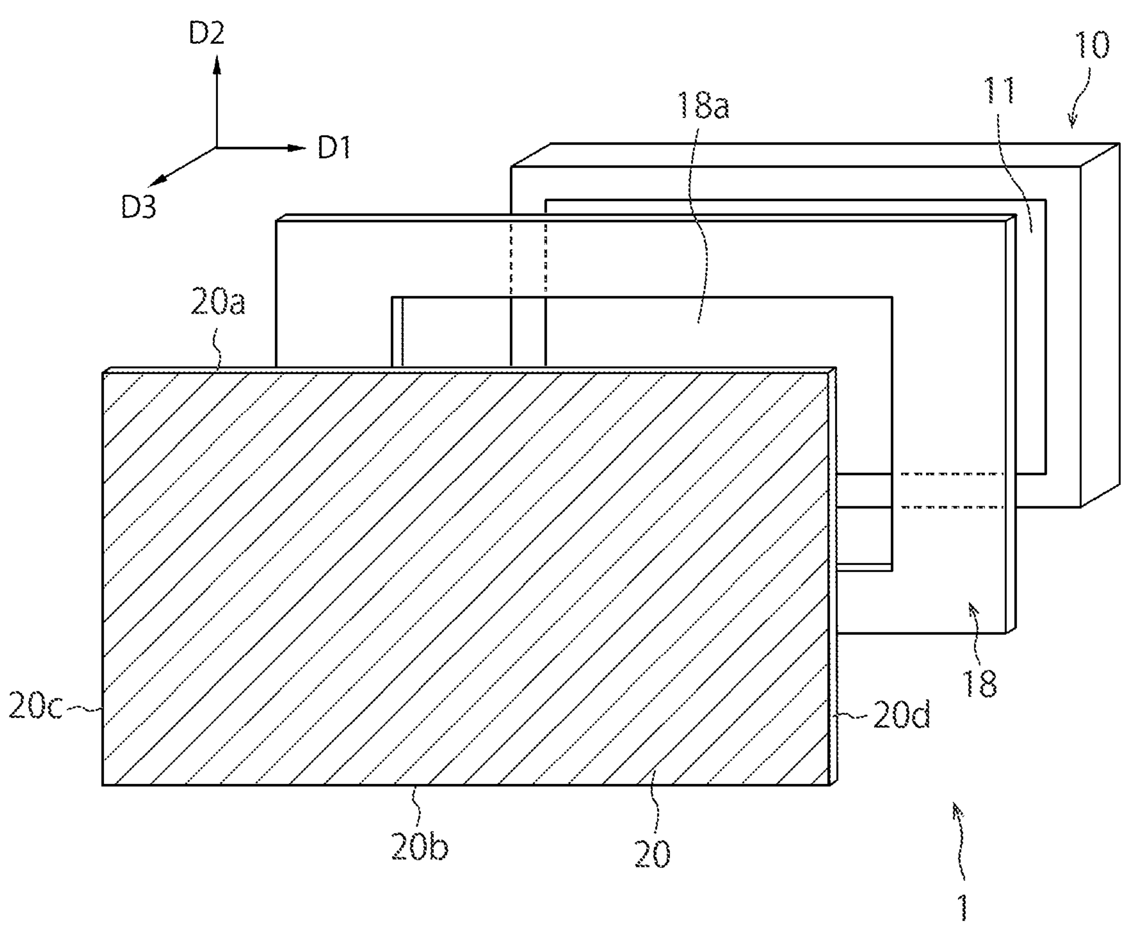
FIG. 1 is an exploded perspective view that explains one embodiment and schematically illustrates an example of a decorative-sheet-attached display device.
FIG. 2 is a lateral cross-sectional view of the decorative-sheet-attached display device illustrated in FIG. 1.

A decorative sheet according to one embodiment includes:

- a decorative layer that visually presents a design, wherein holes arranged in a plurality of directions are provided in the decorative layer,
- an average $A_{A1}$ of values of an array pitch of the holes arranged in a first array direction, in which said average of the values of the array pitch of the holes is a least value among the plurality of directions, is 40 μm or greater and 400 μm or less,
- a value obtained by multiplying, by three, a standard deviation $\sigma_{A1}$ of the array pitch of the holes arranged in the first array direction is 20 μm or less,
- a ratio of the standard deviation $\sigma_{A1}$ (μm) to the average $A_{A1}$ (μm) is 0.0060 or greater,
- an average $A_{A2}$ of values of an array pitch of the holes arranged in a second array direction, in which said average of the values of the array pitch of the holes is a second least value among the plurality of directions, is 40 μm or greater and 400 μm or less,
- a value obtained by multiplying, by three, a standard deviation $\sigma_{A2}$ of the array pitch of the holes arranged in the second array direction is 20 μm or less, and
- a ratio of the standard deviation $\sigma_{A2}$ (μm) to the average $A_{A2}$ (μm) is 0.0060 or greater.

That is, in the decorative sheet according to one embodiment, the following conditions are met:

$$40\ \mu m \leq A_{A1} \leq 400\ \mu m;$$

$$40\ \mu m \leq A_{A2} \leq 400\ \mu m;$$

$$3 \times \sigma_{A1} \leq 20\ \mu m;$$

$$3 \times \sigma_{A2} \leq 20\ \mu m;$$

$$0.0060 \leq \sigma_{A1}/A_{A1};$$

$$0.0060 \leq \sigma_{A2}/A_{A2}.$$

In the decorative sheet according to one embodiment, a ratio, to an average $A_D$ (μm) of values of a diameter of the holes provided in the decorative layer, of a standard deviation $\sigma_D$ (μm) of the diameter of the holes may be 0.080 or less. That is, the following condition may be met:

$$\sigma_D/A_D \leq 0.080.$$

In the decorative sheet according to one embodiment, the average $A_{A1}$ (μm) of the values of the array pitch of the holes arranged in the first array direction and the standard deviation $\sigma_{A1}$ (μm) thereof and the average $A_{A2}$ (μm) of the values of the array pitch of the holes arranged in the second array direction and the standard deviation $\sigma_{A2}$ (μm) thereof may meet the following condition:

$$|\sigma_{A1}/A_{A1} - \sigma_{A2}/A_{A2}| \leq 0.0010.$$

In the decorative sheet according to one embodiment, the decorative layer may include a design layer that visually presents the design and a light shielding layer stacked with the design layer.

In the decorative sheet according to one embodiment, the decorative layer may further include a white layer located between the design layer and the light shielding layer.

The decorative sheet according to one embodiment may further include: a substrate stacked with the decorative layer, wherein

- the light shielding layer may be located between the substrate and the design layer, and
- a width of the hole at a base end located closer to the substrate may be less than a width of the hole at a distal end located farther from the substrate.

In the decorative sheet according to one embodiment, the average $A_D$ of the values of the diameter of the holes provided in the decorative layer may be 20 μm or greater and 200 μm or less.

In the decorative sheet according to one embodiment, an aperture ratio of the decorative layer may be 5% or greater and 50% or less.

In the decorative sheet according to one embodiment, a total luminous transmittance may be 3% or greater and 40% or less.

In the decorative sheet according to one embodiment, a thickness of the decorative layer may be 1 μm or greater and 20 μm or less.

The decorative sheet according to one embodiment may further include: a transparent substrate stacked with the decorative layer.

In the decorative sheet according to one embodiment, the decorative layer may include one or more selected from the group consisting of wood, natural fiber, natural leather, natural stone, synthetic fiber, synthetic leather, and artificial stone.

A decorative-sheet-attached display device according to one embodiment includes:

- a display device; and
- the decorative sheet according to any one of the present disclosure stated above, said decorative sheet being disposed to be stacked with the display device.

In the decorative-sheet-attached display device according to one embodiment, an array pitch of pixels included in the display device for displaying a same color may be 40 μm or greater and 500 μm or less.

A sheet article according to one embodiment includes: the decorative sheet according to any one of the present disclosure stated above.

In the sheet article according to one embodiment, the first array direction of the decorative sheet may be inclined with respect to a length direction of the sheet article, and the second array direction of the decorative sheet may be inclined with respect to the length direction of the sheet article.

The sheet article according to one embodiment may be wrapped around a roll axis, wherein the first array direction of the decorative sheet may be inclined with respect to the roll axis, and the second array direction of the decorative sheet may be inclined with respect to the roll axis.

A method of manufacturing a decorative sheet according to one embodiment includes:

- producing a laminated body that includes a base decorative layer in which a design is formed;
- forming holes in the base decorative layer by, while performing relative movement of the laminated body with respect to a laser irradiation apparatus that has a plurality of irradiation ports, applying laser light intermittently from the plurality of irradiation ports onto the laminated body, wherein in forming the holes, the laminated body is moved relatively with respect to the laser irradiation apparatus in a direction that is not parallel to an array direction of the plurality of irradiation ports, and either a speed of the relative movement of the laminated body with respect to the laser irradiation apparatus or irradiation time intervals of the laser light from the irradiation ports is, or both are, varied.

In forming the holes in the method of manufacturing the decorative sheet according to one embodiment, the laminated body may be moved relatively with respect to the laser irradiation apparatus in an inclined direction that is inclined with respect to the array direction of the plurality of irradiation ports.

In the method of manufacturing the decorative sheet according to one embodiment, the holes may be arranged in a plurality of directions in the manufactured decorative sheet, and a first array direction, in which an average of values of an array pitch of the holes is a least value among the plurality of directions, may be not parallel to the inclined direction.

In the method of manufacturing the decorative sheet according to one embodiment, a second array direction, in which an average of values of an array pitch of the holes is a second least value among the plurality of directions, may be not parallel to the inclined direction.

In the method of manufacturing the decorative sheet according to one embodiment, an array pitch of the holes in a direction parallel to the direction of the relative movement of the laminated body with respect to the laser irradiation apparatus in the manufactured decorative sheet may be greater than an array pitch of the irradiation ports.

In the method of manufacturing the decorative sheet according to one embodiment, varying of the speed of the relative movement of the laminated body with respect to the laser irradiation apparatus and varying of the irradiation time intervals of the laser light from the irradiation ports may be executed concurrently in at least a part of a period.

In forming the holes in the method of manufacturing the decorative sheet according to one embodiment, laser light having passed through the film material may be applied to the base decorative layer.

In the method of manufacturing the decorative sheet according to one embodiment, absorption of the base decorative layer to absorb the laser light may be 3% or greater.

In the method of manufacturing the decorative sheet according to one embodiment, absorption of the film material to absorb the laser light may be less than the absorption of the base decorative layer to absorb the laser light.

In the method of manufacturing the decorative sheet according to one embodiment, the base decorative layer may include a base design layer and a base light shielding layer, the base light shielding layer may be located between the film material and the base design layer, and absorption of the base light shielding layer to absorb the laser light may be 3% or greater.

In the method of manufacturing the decorative sheet according to one embodiment, the base decorative layer may include a base design layer and a base light shielding layer, the base light shielding layer may be located between the film material and the base design layer, and absorption of the film material to absorb the laser light may be less than absorption of the base light shielding layer to absorb the laser light.

In the method of manufacturing the decorative sheet according to one embodiment, the base decorative layer may include a base design layer and a base light shielding layer, the base light shielding layer may be located between the film material and the base design layer, and the base light shielding layer may be in contact with the film material.

With reference to the drawings, an exemplary embodiment of the present disclosure will now be described. In the drawings attached to this description, a scale and a dimensional aspect ratio, etc. will be altered from an actual scale/ratio, etc. in an exaggerated manner for easier illustration and easier understanding.

Terms that are used in this description to specify shapes and geometric conditions, and the extent thereof, for example, terms such as “parallel”, “perpendicular”, “same”, etc. and values of length, angle, etc., shall be construed each to encompass a range in which a similar function can be expected, without being limited to its strict sense.

Terms such as “sheet”, “film”, and “plate”, etc. in this description are not distinguished from one another based on differences in nominal designation only. For example, a “decorative sheet” shall not be construed to be different from a member called a decorative film or a decorative plate, etc. based on its difference in nominal designation only.

In this description, when a plurality of candidates for an upper limit value and a plurality of candidates for a lower limit value regarding a certain parameter are mentioned, the numerical range of this parameter may be constructed by combining any one candidate for the upper limit value and any one candidate for the lower limit value. For example, suppose that a sentence says, “The parameter B is, for example, A1 or greater, or may be A2 or greater, or A3 or greater; the parameter B is, for example, A4 or less, or may be A5 or less, or A6 or less.” In this case, the numerical range of the parameter B may be A1 or greater and A4 or less, A1 or greater and A5 or less, A1 or greater and A6 or less, A2 or greater and A4 or less, A2 or greater and A5 or less, A2 or greater and A6 or less, A3 or greater and A4 or less, A3 or greater and A5 or less, or A3 or greater and A6 or less.

To make directional relationships between the drawings clear, some of the drawings show common directions indicated by arrows with common reference signs. The head of an arrow points to one side in each direction. A symbol of a dot in a circle denotes an arrow pointing to the near side from the sheet face of the drawing in a direction perpendicular to the sheet face of the drawing, for example, as illustrated in FIG. 2.

Figure 4:
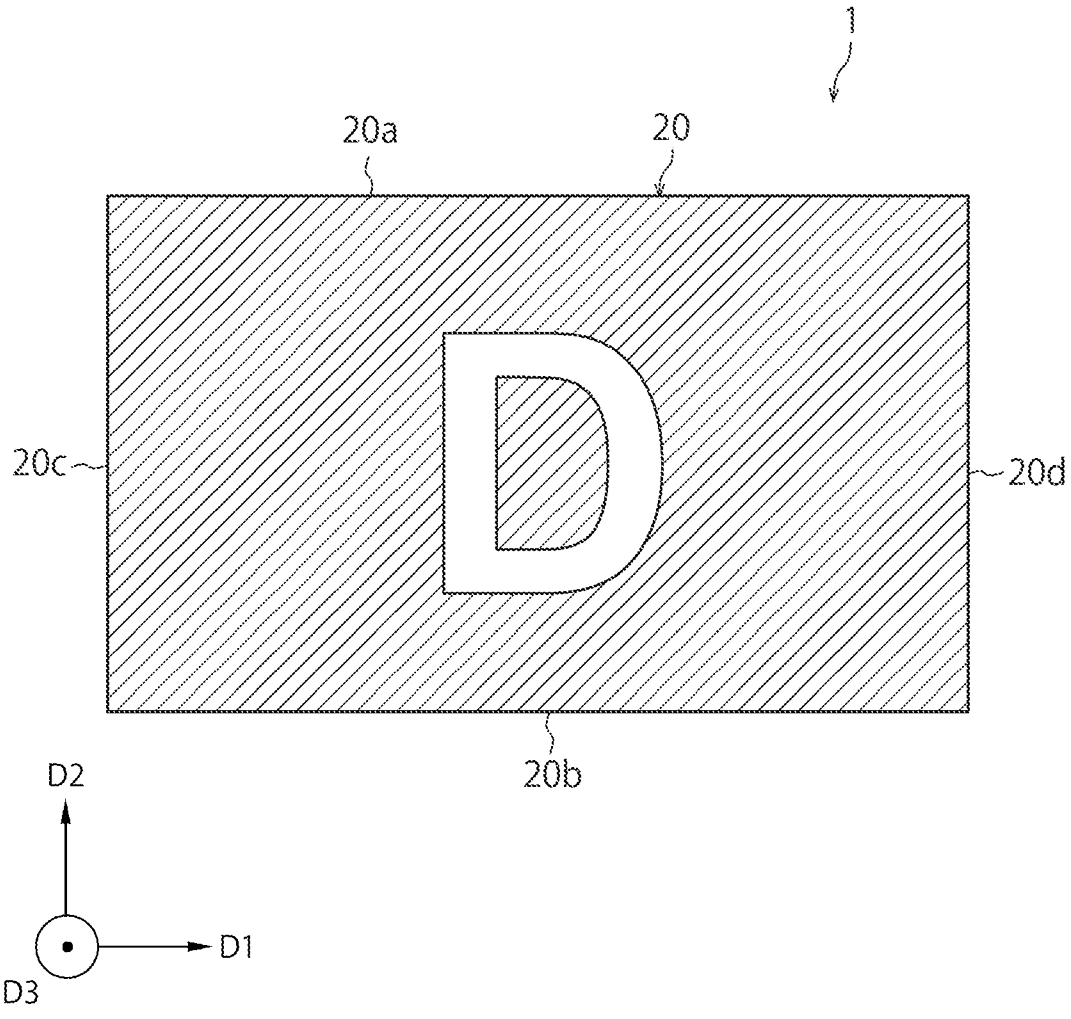
FIG. 4 is a front view of the decorative-sheet-attached display device illustrated in FIG. 1, illustrating a state in which its display device is performing display.

FIGS. 1 to 17 are diagrams for explaining an embodiment. Among them, FIG. 1 is an exploded perspective view that schematically illustrates a specific example of a decorative-sheet-attached display device 1, and FIG. 2 is a lateral cross-sectional view thereof. As illustrated in FIGS. 1 and 2, the decorative-sheet-attached display device 1 includes a display device 10, and a decorative sheet 20 overlapped with the display device 10. In the decorative-sheet-attached display device 1, when the display device 10 is in a non-display state, the decorative sheet hides the display device 10 and expresses a design (see FIG. 1). On the other hand, when the display device 10 displays an image, the image is viewable through the decorative sheet 20 (FIG. 4). In addition, in the decorative sheet 20 according to the present embodiment, an inventive measure has been taken for suppressing a fringe pattern appearing on the decorative sheet when the display device 10 is in a display state. More specifically, holes 22 for allowing image light to pass therethrough are provided in a decorative layer 30 of the decorative sheet 20, and an inventive measure has been taken in terms of the arrangement of the holes 22.

An embodiment will be described below with reference to specific examples illustrated in the drawings.

As illustrated in FIGS. 1 and 2, the decorative-sheet-attached display device 1 includes the display device 10 and the decorative sheet 20. The display device 10 has a display surface 11. The decorative sheet 20 covers the display surface 11. The decorative-sheet-attached display device 1 can express a design by means of its decorative sheet 20. With the decorative sheet 20, it is possible to install the display device 10 while making the display device 10 harmonized with an ambient environment.

In the illustrated example, the display surface 11 has a rectangular shape in a plan view. The display surface 11 having a rectangular shape extends in a first direction D1 and a second direction D2. The display device 10 and the decorative sheet 20 are stacked in a third direction D3, which is a normal direction normal to the display surface 11 and is perpendicular to both the first direction D1 and the second direction D2.

The decorative-sheet-attached display device 1 illustrated in FIGS. 1 and 2 has a flat-plate-like shape. However, the decorative-sheet-attached display device 1 may be curved by configuring the component(s) of the decorative-sheet-attached display device 1 to have a curved structure. For example, the decorative sheet 20 only may be curved. In addition to the decorative sheet 20, at least the display surface 11 of the display device 10 may be curved.

The decorative-sheet-attached display device 1 can be used for various applications. The decorative-sheet-attached display device 1 can be applied to the interior of a mobile entity (mobile object, movable body) that is movable. Examples of the mobile entity are an automobile, a ship, an airplane, and the like. In a specific example illustrated in FIG. 3A, the decorative-sheet-attached display device 1 is applied to the center console of an automobile. In the example illustrated in FIG. 3A, the decorative-sheet-attached display device 1 can constitute a car navigation system, a stereo, a communication terminal, or the like. The decorative-sheet-attached display device 1 can be applied to a wall, a door, a ceiling, a partition, or the like as an interior part of a building. The decorative-sheet-attached display device 1 can be applied also to furniture and various kinds of device such as a home appliance. In an example illustrated in FIG. 3B, the decorative-sheet-attached display device 1 is applied to a desk. In an example illustrated in FIG. 3C, the decorative-sheet-attached display device 1 is applied to a refrigerator.

A dot matrix scheme is adopted in the display device 10. The display device 10 has a plurality of pixels that form dots. The display device 10 forms a desired image on the display surface 11 by controlling a light emission state on a pixel-by-pixel basis. Examples of the display device 10 are a liquid crystal display device, an electroluminescence display device also called an EL display device, and the like.

In the example illustrated in FIG. 2, the display device 10 includes a surface light source device 12 and a display panel 15. The surface light source device 12 is a device that emits light in a surface-illuminant manner. The surface light source device 12 has an emission surface 13 from which light is emitted. The emission surface 13 has a rectangular shape in a plan view, similarly to the display surface 11. The emission surface 13 has edges extending in both the first direction D1 and the second direction D2. The surface light source device 12 is not specifically limited, and various types of device, for example, an edge-light type or a direct-lit type, may be used. The display panel 15 is stacked on the surface light source device 12 in the third direction D3. The display panel 15 is, for example, a liquid crystal display panel. The display panel 15 may form an image by controlling the transmission of surface light entering from the surface light source device 12 on a pixel-by-pixel basis.

Figure 5:
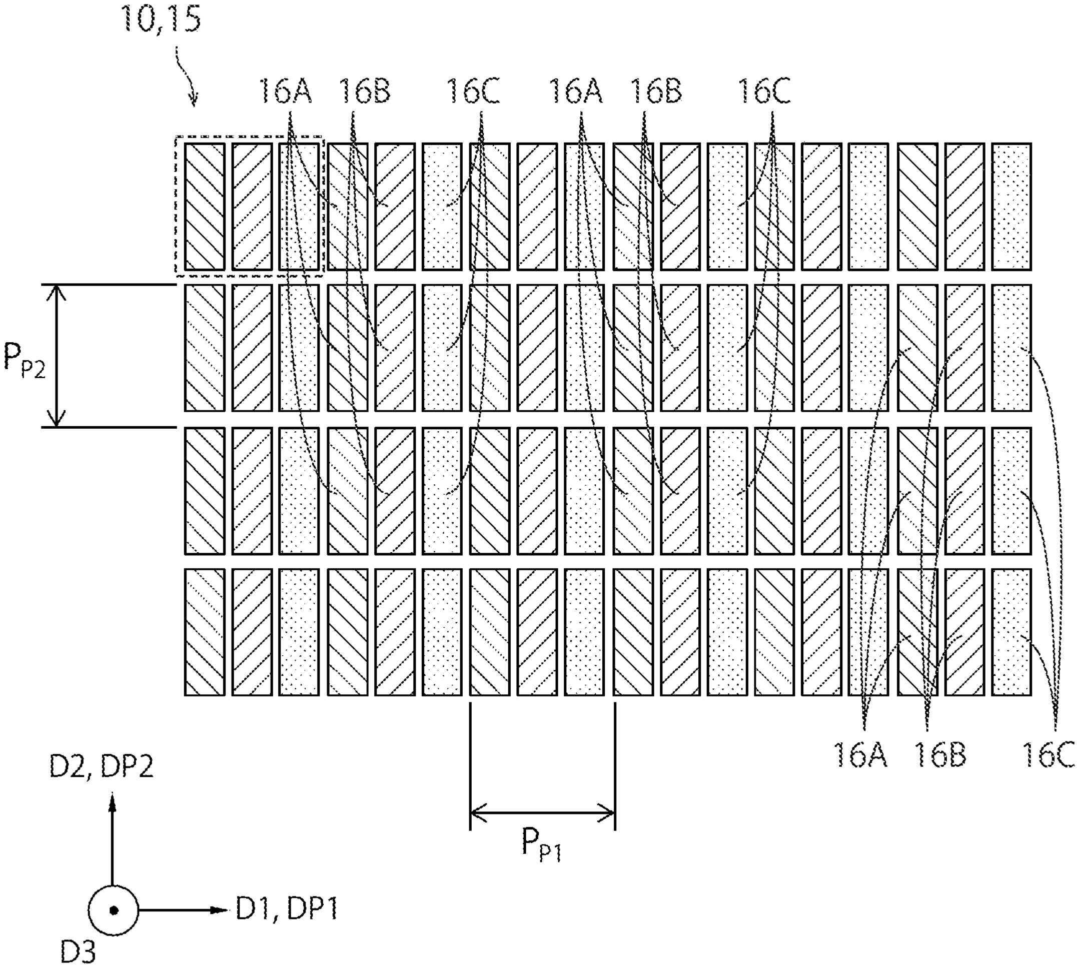
FIG. 5 is a plan view illustrating an example of pixel arrangement of a display device included in the decorative-sheet-attached display device illustrated in FIG. 1.

FIG. 5 illustrates an example of pixel arrangement in the display device 10. The illustrated display device 10 includes first pixels 16A, second pixels 16B, and third pixels 16C that emit light of colors different from one another. The plurality of first pixels 16A is arranged in a first pixel array direction DP1 and a second pixel array direction DP2 that are not parallel to each other. In the illustrated example, the first pixel array direction DP1 and the second pixel array direction DP2 are perpendicular to each other, though not limited thereto. The plurality of first pixels 16A is arranged in the first pixel array direction DP1 at a first pixel array pitch $P_{P1}$. The plurality of first pixels 16A is arranged in the second pixel array direction DP2 at a second pixel array pitch $P_{P2}$.

Similarly, the plurality of second pixels 16B is arranged in the first pixel array direction DP1 at the first pixel array pitch $P_{P1}$. The plurality of second pixels 16B is arranged in the second pixel array direction DP2 at the second pixel array pitch $P_{P2}$. The plurality of third pixels 16C is arranged in the first pixel array direction DP1 at the first pixel array pitch $P_{P1}$. The plurality of third pixels 16C is arranged in the second pixel array direction DP2 at the second pixel array pitch $P_{P2}$.

The first pixels 16A, the second pixels 16B, and the third pixels 16C are arranged one after another cyclically in the first pixel array direction DP1. The plurality of first pixels 16A is arranged successively in the second pixel array direction DP2. The plurality of second pixels 16B is arranged successively in the second pixel array direction DP2. The plurality of third pixels 16C is arranged successively in the second pixel array direction DP2. One first pixel 16A, one second pixel 16B, and one third pixel 16C that are arranged successively in the first pixel array direction DP1 constitute a unit pixel. In FIG. 5, one unit pixel is marked as an example by being enclosed in a dotted-line frame.

For example, the first pixel 16A emits red image light. The second pixel 16B emits green image light. The third pixel 16C emits blue image light. In the illustrated example, the first pixel array direction DP1 is parallel to the first direction D1. The second pixel array direction DP2 is parallel to the second direction D2.

The arrangement of pixels in the display device 10 is not limited to the illustrated example, and various configurations may be adopted. The array pitch of the pixels of the display device 10 to which the decorative sheet 20 is applied may be, for example, 40 μm or greater and 500 μm or less. If the array pitch is within this range, it is possible to suppress the occurrence of a fringe pattern effectively when combined with the decorative sheet 20 according to the present embodiment, in which the arrangement of holes to be described later is adopted. The array pitch of the pixels of the display device 10 that can be used for a mobile entity may be, for example, 40 μm or greater and 200 μm or less. The array pitch of the pixels of the display device 10 that can be used for a home appliance, furniture, etc. may be, for example, 120 μm or greater and 300 μm or less. With the display device 10 having this pixel arrangement, it is possible to suppress the occurrence of a fringe pattern more effectively when combined with the decorative sheet 20 according to the present embodiment, in which the arrangement of holes to be described later is adopted. The array pitch of the pixels means the array pitch $P_{P1}$, $P_{P2}$ of so-called sub pixels. In other words, the array pitch of the pixels means the array pitch of pixels of the same color among the plurality of pixels included in the display device.

As illustrated in FIGS. 1 and 2, the decorative-sheet-attached display device 1 may further include a panel member 18. The illustrated panel member 18 is located between the display device 10 and the decorative sheet 20 in the third direction D3. A transmissive area 18*a* is provided in the panel member 18. The transmissive area 18*a* may be an opening or a transparent portion, etc. provided in the panel member 18. The transmissive area 18*a* is disposed in such a way as to overlap with the display surface 11 of the display device 10. Image light outputted from the display device 10 passes through the transmissive area 18*a* to go toward the decorative sheet 20. The panel member 18 can be configured as, for example, a panel member, a wall member, a casing, or the like applied to the site where the display device 10 is installed. The decorative sheet 20 may be bonded to the panel member 18.

In the example illustrated in FIGS. 1 and 2, the display surface 11 is located at the entire transmissive area 18*a* of the panel member 18. The decorative sheet 20 covers at least the entire transmissive area 18*a* of the panel member 18. The illustrated decorative sheet 20 extends throughout the entire area of the panel member 18. However, the decorative sheet 20 may cover only a part of the area other than the transmissive area 18*a* of the panel member 18 in addition to covering the entire transmissive area 18*a*, without being limited to the illustrated example. The decorative sheet 20 may cover the entire transmissive area 18*a* only.

Unlike the illustrated example, the panel member 18 may be disposed at the opposite side, which is the opposite of the side where the display device 10 is disposed, with respect to the decorative sheet 20 in the third direction D3. That is, the decorative sheet 20 may be located between the panel member 18 and the display device 10 in the third direction D3. The panel member 18 may be omitted.

The term "transparent" used in this description means that visible light transmittance is 50% or greater, preferably, 80% or greater. Unless otherwise specified, visible light transmittance means beam transmittance in visible light spectrum and is defined as an average of transmittance in each wavelength region when measured using a spectrophotometer ("UV-3100PC" manufactured by Shimadzu Corporation, compliant with JIS K 0115) within a range of measurement wavelengths of 380 nm to 780 nm in units of 1 nm at an incident angle of 0°.

Next, the decorative sheet 20 will now be described. The decorative sheet 20 has a design and imparts design property to the decorative-sheet-attached display device 1. Moreover, the decorative sheet 20 is configured such that image light coming from the display device 10 can pass therethrough. The decorative sheet 20 includes a decorative layer 30 that visually presents (shows or displays) the design expressed by the decorative sheet 20. That is, the decorative layer 30 is added with decoration. The decorative layer 30 has holes 22 so that image light can pass therethrough.

The decorative sheet 20 covers at least the entire display surface 11 so that the display surface 11 cannot be viewed directly from the outside. In the illustrated example, the decorative sheet 20 is located at the position that is closest in the third direction D3 to the person who views the decorative-sheet-attached display device 1. The decorative sheet 20 as a whole is a flat-plate-like member extending in the same directions as those of the display surface 11 of the display device 10. The thickness of the decorative sheet 20 may be, for example, 20 μm or greater and 550 μm or less.

The illustrated decorative sheet 20 has a rectangular shape in a plan view. The term "plan view" means a view in the third direction D3. The decorative sheet 20 includes, as its longer sides, a first edge 20*a* and a second edge 20*b* that extend in parallel with each other. The decorative sheet 20 further includes, as its shorter sides, a third edge 20*c* and a fourth edge 20*d* that extend in parallel with each other. As illustrated in FIG. 1, the first edge 20*a* and the second edge 20*b* extend linearly in the first direction D1. The third edge 20*c* and the fourth edge 20*d* extend linearly in the second direction D2 perpendicular to the first direction D1.

Figure 6A:
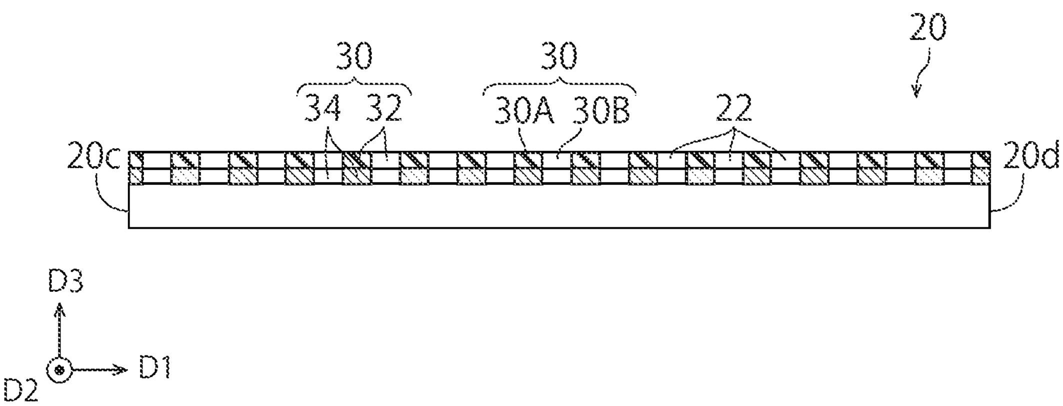
FIG. 6A is a lateral cross-sectional view illustrating an example of a decorative sheet included in the decorative-sheet-attached display device illustrated in FIG. 1.

FIG. 6A illustrates a specific example of the decorative sheet 20. The decorative sheet 20 further includes a substrate 25 that supports the decorative layer 30. The substrate 25 has a shape like a sheet. The substrate 25 and the decorative layer 30 are stacked in the third direction D3. In the example illustrated in FIG. 6A, the substrate 25 is located between the decorative layer 30 and the display device 10 in the third direction D3. The substrate 25 may be transparent. Image light passes through the substrate 25. A film made of resin can be used as the substrate 25. Examples of the material of the substrate 25 are polymethyl methacrylate, polyethylene terephthalate, polyethylene naphthalate, polycarbonate, polystyrene, cyclic polyolefin, ABS (acrylonitrile-butadiene-styrene copolymer), and the like. The thickness of the substrate 25 is, for example, 10 μm or greater and 500 μm or less, with visible light transmission property and proper supporting of the decorative layer 30, etc. considered.

The decorative layer 30 will now be described. The decorative layer 30 has design property. The decorative layer 30 visually presents (shows or displays) a design. As illustrated in FIG. 6A, the decorative layer 30 may include a design layer 32 and a light shielding layer 34 that are stacked in the third direction D3. The light shielding layer 34 is located closer to the display device 10 in the third direction D3 than the design layer 32 is. The light shielding layer 34 is located between the design layer 32 and the display device 10 in the third direction D3. In the illustrated example, the holes 22 go through both the design layer 32 and the light shielding layer 34.

The design presented visually by the decorative sheet 20 is formed in the design layer 32. In the design layer 32, a figure, a pattern, a design, colors, a picture, a photo, a character, a mark, a pictogram, and/or a pictorial pattern of characters and numerals, etc. may be provided as the design. The design layer 32 can also perform design expression of visually presenting a background. For example, as a design that makes it possible to harmonize the decorative sheet with an ambient environment in which the decorative-sheet-attached display device 1 is installed, the design layer 32 may visually present a woodgrain or marble pattern, a metallic texture, or a geometric pattern. The design layer 32 may be formed by printing. For example, the design layer 32 may be a print layer formed by printing on the light shielding layer 34. The design layer 32 may be formed by transfer. The design layer 32 may be a transfer layer transferred onto the light shielding layer 34. The thickness of the design layer 32 may be, for example, 1 μm or greater and 20 μm or less.

The light shielding layer 34 is a dark-color layer. The light shielding layer 34, as a coloring layer that is based on a dark color(s), is capable of visually presenting a design. The light shielding layer 34 is a layer having visible light transmittance lower than that of the design layer 32. The visible light transmittance of the light shielding layer 34 is lower than that of the design layer 32. The light shielding layer 34 may have light shielding property. The light shielding property may be controlled by adjusting the thickness of the light shielding layer 34. The light shielding layer 34 covers the design layer 32 against the display device 10. The light shielding layer 34 suppresses the incidence of image light coming from the display device 10 on the design layer 32. With the light shielding layer 34, it is possible to suppress the transmission of image light through the design layer 32 when an image is displayed. The light shielding layer 34 includes, for example, binder resin and light absorbing particles dispersed in the binder resin. Examples of the light absorbing particles are black pigments such as carbon black and titanium black. The light shielding layer 34 having a sufficient thickness enables deep and clear visual presentation of the design formed by the design layer 32. The thickness of the light shielding layer 34 may be 1 μm or greater and 20 μm or less.

Unlike the illustrated example, the decorative sheet 20 may further include a ground layer between the decorative layer 30 and the light shielding layer 34. The ground layer can be configured as a layer of various kinds of color. That is, providing the ground layer makes it possible to select the color(s) of the design layer 32 without being restricted by the light shielding layer 34. For example, the ground layer may be a white layer. Having scattering reflective property, the white ground layer enables the design layer 32 to visually present the design clearly.

As described earlier, the holes 22 that enable the transmission of image light are provided in the decorative layer 30. The decorative layer 30 includes a decorative portion 30A, which forms a design, and a transmissive portion 30B, which is a portion where the decorative portion 30A is not formed. The decorative portion 30A is formed at, of the decorative layer 30, an area where the holes 22 are not provided. The transmissive portion 30B is formed at, of the decorative layer 30, an area where the holes 22 are provided. That is, the decorative portion 30A is a portion where the design layer 32 is formed. The transmissive portion 30B is, of the decorative layer 30, a portion where the decorative portion 30A is not formed. The transmissive portion 30B is, of the decorative layer 30, a portion where the design layer 32 is not formed. The transmissive portion 30B is, of the decorative sheet 20, a portion where image light coming from the display device 10 passes. Therefore, the transmissive portion 30B has high visible light transmission property.

Figure 6B:
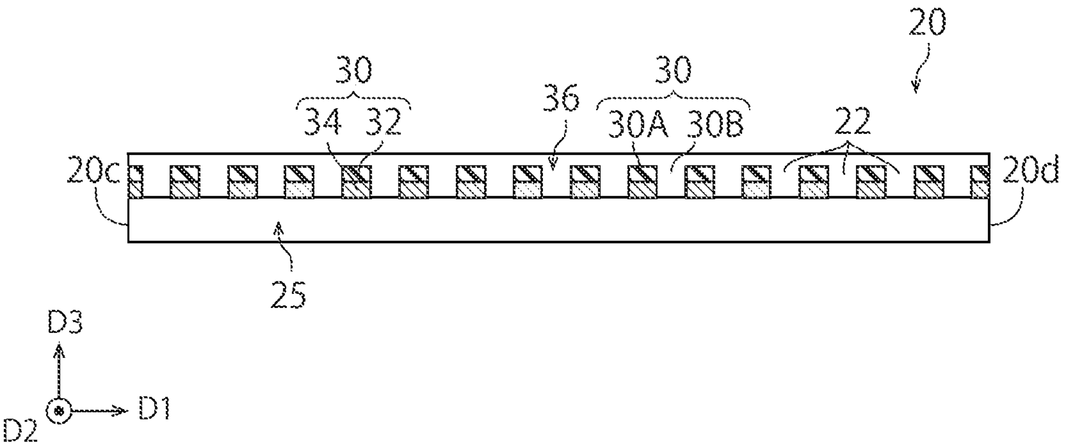
FIG. 6B is a lateral cross-sectional view illustrating another example of a decorative sheet included in the decorative-sheet-attached display device illustrated in FIG. 1.
Figure 6C:
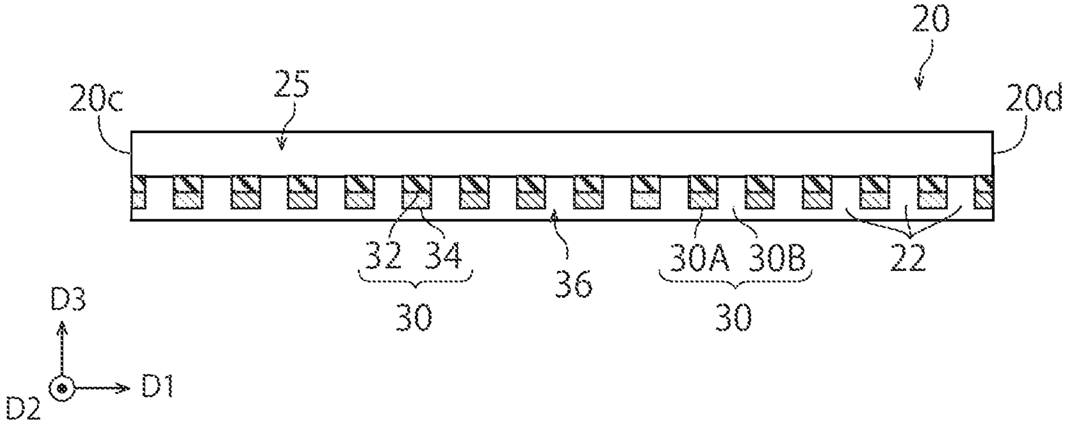
FIG. 6C is a lateral cross-sectional view illustrating another example of a decorative sheet included in the decorative-sheet-attached display device illustrated in FIG. 1.

As in examples illustrated in FIGS. 6A to 6C, the holes 22 that enable the transmission of image light may be through holes formed in the decorative layer 30. In the examples illustrated in FIGS. 6A to 6C, the decorative layer 30 includes the design layer 32 and the light shielding layer 34. The holes 22 go through both the design layer 32 and the light shielding layer 34. As will be described later, the holes 22 that enable the transmission of image light do not necessarily have to be through holes going through the decorative layer 30 throughout its entire thickness.

In the example illustrated in FIG. 6A, the holes 22 that constitute the transmissive portion 30B are open at the opposite side in relation to the display device 10. The transmissive portion 30B illustrated in FIG. 6A is void, but is not limited thereto. In the example illustrated in FIG. 6B, the decorative sheet 20 further includes a cover layer 36 that covers the decorative layer 30 from the opposite side in relation to the substrate 25 in the third direction D3. The cover layer 36 is transparent and allows image light to pass through itself. The illustrated cover layer 36 covers the decorative layer 30 and, in addition, is filled in the holes 22. In the example illustrated in FIG. 6B, the cover layer 36 inside the holes 22 constitutes the transmissive portion 30B. The cover layer 36 is capable of protecting the decorative portion 30A and suppressing the entry of a foreign substance such as dust into the holes 22.

The cover layer 36 should preferably be made of a material having a small refractive index difference from the substrate 25. It is possible to suppress refraction at an interface between the cover layer 36 and the substrate 25 by reducing the refractive index difference between the cover layer 36 and the substrate 25. This makes it possible to suppress the distortion of an image displayed by the display device 10. For example, a resin material having a refractive index of 1.33 to 1.77 can be used for forming the cover layer 36. In this example, acrylic resin having a refractive index of 1.53 to 1.57 is used for forming the substrate 25. Examples of the material of the cover layer 36 are polymethyl methacrylate resin, fluororesin, silicone resin, polypropylene, urethane resin, polyethylene, nylon, polyvinyl chloride, epoxy, polycarbonate, polystyrene, and the like.

As illustrated in FIG. 6C, the decorative layer 30 may be located between the substrate 25 and the display device 10 in the third direction D3. In the decorative sheet 20 illustrated in FIG. 6C, the design layer 32 and the light shielding layer 34 are formed in this order on the substrate 25. The decorative sheet 20 illustrated in FIG. 6C further includes the cover layer 36 that covers the decorative layer 30 from the surface side closer to the display device 10. However, the cover layer 36 can be omitted from the decorative sheet 20 illustrated in FIG. 6C.

Figure 7:
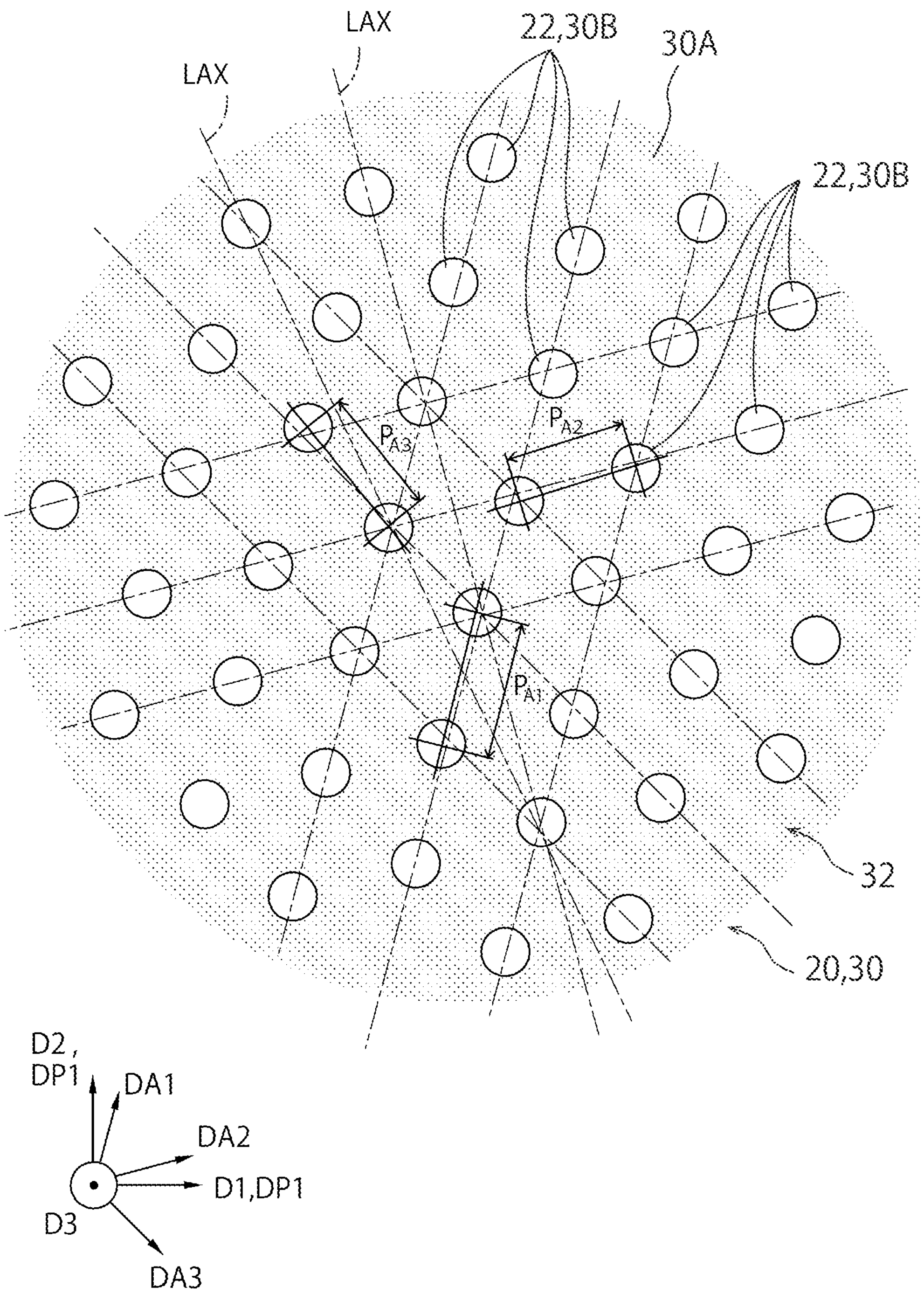
FIG. 7 is an enlarged plan view illustrating a decorative sheet that can be included in the decorative-sheet-attached display device illustrated in FIG. 1 and illustrating the arrangement of holes provided in the decorative sheet.

FIG. 7 is a partial plan view of the decorative sheet 20. As illustrated in FIG. 7, the decorative sheet 20 in a plan view can be divided into the decorative portion 30A and the transmissive portion 30B. In the illustrated example, the position, shape, and area size of the hole 22 determine the position, shape, and area size of the transmissive portion 30B respectively. The shape of the hole 22 in a plan view is not specifically limited. Examples of the shape of the hole 22 in a plan view are a shape that includes a curved contour such as a circular shape or an elliptical shape, a polygonal shape such as a triangular shape, a quadrangular shape, a pentagonal shape, a hexagonal shape, or an octagonal shape, a chamfered polygonal shape, and the like. However, in order to ensure isotropy in optical characteristics, the hole should preferably have a circular shape in a plan view. In the example illustrated in FIG. 7, the shape of the hole 22 in a plan view is a circle.

The ratio of the size of the area occupied by the holes 22 to the size of the area of the decorative layer 30 in a plan view is defined as the aperture ratio of the decorative layer 30. The contour of the hole 22 in a plan view is identified as the contour of a portion that enables the transmission of visible light and thus can contribute to viewing an image. The contour of the hole 22 formed as a through hole corresponds to the contour of a portion that goes through the decorative layer 30 in projection in the third direction D3. The area size of each hole 22 formed as a through hole is the area size of a portion that goes through the decorative layer 30 in projection in the third direction D3. That is, the size of an area which goes through the decorative layer 30 in the third direction D3 throughout its entire thickness and at which light traveling in the third direction D3 can pass through the decorative layer 30 without entering the decorative portion 30A is defined as the area size of each hole 22. The area of each hole 22 defined as described above is an area that enables the viewing of the display device when viewed in the third direction D3. The measurement of the aperture ratio is performed using a digital microscope VHX- 6000 manufactured by Keyence Corporation. Specifically, an image is captured in a transmissive mode in a state of light irradiation from the back side, and a portion where light comes therethrough is identified as a hole. In a case where the holes have a shape of circles arranged in a certain fixed cycle or a shape approximate to such circles, it is possible to calculate the aperture ratio by using an average of the diameters of the circles and the cycle of the holes.

The lower limit value of the aperture ratio of the decorative layer 30 should preferably be determined such that an image can be viewed clearly enough in a state in which the display device 10 performs image display. The aperture ratio of the decorative layer 30 should preferably be 5% or greater, or more preferably, 10% or greater, or more preferably, 15% or greater. The upper limit value of the aperture ratio of the decorative layer 30 should preferably be determined such that the design of the decorative layer 30 can be viewed clearly enough in a state in which the display device 10 performs no image display. The aperture ratio of the decorative layer 30 should preferably be 50% or less, or more preferably, 45% or less, or more preferably, 40% or less.

The lower limit value of the total luminous transmittance of the decorative sheet should preferably be determined such that an image can be viewed clearly enough in a state in which the display device 10 performs image display. The total luminous transmittance of the decorative sheet should preferably be 3% or greater, or more preferably, 5% or greater, or more preferably, 10% or greater. The upper limit value of the total luminous transmittance of the decorative sheet should preferably be determined such that the design of the decorative layer 30 can be viewed clearly enough in a state in which the display device 10 performs no image display. The total luminous transmittance of the decorative sheet should preferably be 40% or less, or more preferably, 35% or less, or more preferably, 30% or less. The total luminous transmittance of the decorative sheet can be set to be within a preferred range by setting the diameter and pitch of the holes and the transmittance of the substrate 25 as appropriate. The total luminous transmittance of the decorative sheet is measured using a haze meter HM-150N (Murakami Color Research Laboratory) in compliance with JIS K 7136: 2000.

In the present embodiment, the holes 22 are arranged in a plurality of array directions. Let $A_{A1}$ (μm) be an average of values of an array pitch $P_{A1}$ of the holes 22 arranged in a first array direction DA1. Let $\sigma_{A1}$ (μm) be a standard deviation of the array pitch $P_{A1}$ of the holes 22 arranged in the first array direction DA1. Let $A_{A2}$ (μm) be an average of values of an array pitch $P_{A2}$ of the holes 22 arranged in a second array direction DA2. Let $\sigma_{A2}$ (μm) be a standard deviation of the array pitch $P_{A2}$ of the holes 22 arranged in the second array direction DA2. The first array direction DA1 is a direction in which, among the plurality of array directions of the holes 22, the average of the array pitch in said direction is the least value. The second array direction DA2 is a direction in which, among the plurality of array directions of the holes 22, the average of the array pitch in said direction is the second least value. In the present embodiment, the following conditions (A) to (F) are met:

$$40 \le A_{A1} \le 400; \quad \text{(A)}$$

$$40 \le A_{A2} \le 400; \quad \text{(B)}$$

-continued $$3 \times \sigma_{A1} \le 20; \quad \text{(C)}$$

$$3 \times \sigma_{A2} \le 20; \quad \text{(D)}$$

$$0.0060 \le \sigma_{A1}/A_{A1}; \quad \text{(E)}$$

$$0.0060 \le \sigma_{A2}/A_{A2}; \quad \text{(F)}$$

In the description below, the array pitch $P_{A1}$ of the plurality of holes 22 arranged in the first array direction DA1 will be referred to as "first array pitch $P_{A1}$". The average $A_{A1}$ of values of the first array pitch $P_{A1}$ will be referred to as "first pitch average $A_{A1}$", and the standard deviation CA of the first array pitch $P_{A1}$ will be referred to as "first pitch standard deviation $\sigma_{A1}$". Similarly, the array pitch $P_{A2}$ of the plurality of holes 22 arranged in the second array direction DA2 will be referred to as "second array pitch $P_{A2}$". The average $A_{A2}$ of values of the second array pitch $P_{A2}$ will be referred to as "second pitch average $A_{A2}$", and the standard deviation $\sigma A_2$ of the second array pitch $P_{A2}$ will be referred to as "second pitch standard deviation $\sigma_{A2}$".

The conditions (A) and (B) specify the upper limit value and the lower limit value of the first pitch average $A_{A1}$ and the upper limit value and the lower limit value of the second pitch average $A_{A2}$ respectively. The lower limit value of the first pitch average $A_{A1}$ and the lower limit value of the second pitch average $A_{A2}$ are determined such that the design of the decorative layer 30 can be viewed clearly enough in a state in which the display device 10 performs no image display and, in addition, such that an image can be viewed clearly enough in a state in which the display device 10 performs image display. The upper limit value of the first pitch average $A_{A1}$ and the upper limit value of the second pitch average $A_{A2}$ are determined such that an image can be viewed clearly enough in a state in which the display device 10 performs image display. The second pitch average $A_{A2}$ should preferably be twice or less, more preferably, 1.5 times or less, the first pitch average $A_{A1}$. The upper limit value of the first pitch average $A_{A1}$ and the upper limit value of the second pitch average $A_{A2}$ should more preferably be 300 μm or less, or still more preferably, 200 μm or less.

The first pitch average $A_{A1}$ should preferably be less than the pixel pitch of the display device 10 in the first array direction DA1. Setting the first pitch average $A_{A1}$ in relation to the pixel pitch in this way enables light coming from every pixel arranged in the first array direction DA1 to pass through any of the holes 22. The first pitch average $A_{A1}$ should preferably be within a range of 60% or greater and 90% or less in relation to the pixel pitch of the display device 10 in the first array direction DA1. Setting the first pitch average $A_{A1}$ within this range in relation to the pixel pitch makes it possible to make moiré caused by the arrangement of the pixels and the arrangement of the holes 22 obscure.

The second pitch average $A_{A2}$ should preferably be less than the pixel pitch of the display device 10 in the second array direction DA2. Setting the second pitch average $A_{A2}$ in relation to the pixel pitch in this way enables light coming from every pixel arranged in the second array direction DA2 to pass through any of the holes 22. The second pitch average $A_{A2}$ should preferably be within a range of 60% or greater and 90% or less in relation to the pixel pitch of the display device 10 in the second array direction DA2. Setting the second pitch average $A_{A2}$ within this range in relation to the pixel pitch makes it possible to make moiré caused by the arrangement of the pixels and the arrangement of the holes 22 obscure.

The conditions (C) and (D) specify the upper limit value of the first pitch standard deviation $\sigma_{A1}$ and the upper limit value of the second pitch standard deviation $\sigma_{A2}$ respectively. The upper limit value of the first pitch standard deviation $\sigma_{A1}$ and the upper limit value of the second pitch standard deviation $\sigma_{A2}$ are determined in such a way as to be able to sufficiently suppress unevenness in the design presented visually in a state in which the display device 10 performs no image display. The upper limit value of the first pitch standard deviation $\sigma_{A1}$ multiplied by three and the upper limit value of the second pitch standard deviation $\sigma_{A2}$ multiplied by three ($3\times\sigma_{A1}$, $3\times\sigma_{A2}$) should more preferably be 10 μm or less, or still more preferably, 7 μm or less, or still more preferably, 5 μm or less.

The lower limit value of the first pitch standard deviation $\sigma_{A1}$ and the lower limit value of the second pitch standard deviation $\sigma_{A2}$ can be determined in such a way as to be able to sufficiently suppress the occurrence of a fringe pattern in a state in which the display device 10 performs image display. For example, the lower limit value of the first pitch standard deviation $\sigma_{A1}$ multiplied by three and the lower limit value of the second pitch standard deviation $\sigma_{A2}$ multiplied by three ($3\times\sigma_{A1}$, $3\times\sigma_{A2}$) should preferably be 1.0 μm or greater, or more preferably, 2.0 μm or greater, or still more preferably, 3.0 μm or greater. However, through diligent studies, the inventors of the present application found that the parameters specified by the conditions (E) and (F) have a stronger correlation to a fringe pattern than the first pitch standard deviation $\sigma_{A1}$ and the second pitch standard deviation $\sigma_{A2}$ do. Therefore, setting the conditions (E) and (F) is effective for fringe pattern suppression.

The conditions (E) and (F) specify the lower limit value of a ratio of the first pitch standard deviation $\sigma_{A1}$ to the first pitch average $A_{A1}$ and the lower limit value of a ratio of the second pitch standard deviation $\sigma_{A2}$ to the second pitch average $A_{A2}$ respectively. The lower limit value of the ratio "$\sigma_{A1}/A_{A1}$" specified by the condition (E) and the lower limit value of the ratio "$\sigma_{A2}/A_{A2}$" specified by the condition (F) are determined in such a way as to be able to sufficiently suppress the occurrence of a fringe pattern in a state in which the display device 10 performs image display. The lower limit value of the ratio "$\sigma_{A1}/A_{A1}$" and the lower limit value of the ratio "$\sigma_{A2}/A_{A2}$" should more preferably be 0.0080 or greater, or still more preferably, 0.020 or greater.

The upper limit value of the ratio "$\sigma_{A1}/A_{A1}$" and the upper limit value of the ratio "$\sigma_{A2}/A_{A2}$" can be determined in such a way as to be able to sufficiently suppress unevenness in the design presented visually in a state in which the display device 10 performs no image display. For example, the upper limit value of the ratio "$\sigma_{A1}/A_{A1}$" and the upper limit value of the ratio "$\sigma_{A2}/A_{A2}$" should preferably be 0.070 or less, or more preferably, 0.040 or less, or still more preferably, 0.020 or less. However, through diligent studies, the inventors of the present application found that "$3\sigma_{A1}$" and "$3\sigma_{A2}$" specified by the conditions (C) and (D) have a stronger correlation to design unevenness than the value of the ratio "$\sigma_{A1}/A_{A1}$" and the value of the ratio "$\sigma_{A2}/A_{A2}$" do. Therefore, setting the conditions (C) and (D) is effective for unevenness suppression.

In order to judge the conditions (A) to (F), there is a need to find the array directions of the holes 22. The array directions of the holes 22 are found using a microscope by, for example, observing the decorative sheet 20 in a range in which thirty to five hundred holes 22 or so are included, at a magnification of 100 times to 1000 times. In the example illustrated in FIG. 7, which is a schematic view, the holes 22 are arranged in each of the first array direction DA1, the second array direction DA2, and a third array direction DA3. In the example illustrated in FIG. 7, the first array direction DA1, the second array direction DA2, and the third array direction DA3 are inclined at an angle of approximately 60° with respect to one another.

In a case where the conditions (C) and (D) are met, it is usually possible to find the array directions in which the holes 22 are arranged by observing the decorative sheet 20 in a range in which thirty to five hundred holes 22 or so are included, at a magnification of 100 times to 1000 times. The array directions may be found as follows. First, in magnified observation of the decorative sheet 20, one first reference hole located substantially at the center in the range of observation is set, and the direction of connecting the first reference hole to a second reference hole observed to be located closest to the first reference hole is taken as an array direction. In magnified observation of the decorative sheet, the direction of connecting the first reference hole to one or more holes other than the second reference hole near the first reference hole is also taken as an array direction. When this is performed, with the first reference hole taken as a reference, two to four next-closest holes or so, excluding the second reference hole and a hole arranged in the same array direction as the second reference hole are selected as said one or more holes, and the direction of the shortest pitch can be taken as the array direction.

The array pitch of the holes 22 arranged in a particular array direction means a distance between the centers of two holes 22 arranged next to each other in the particular array direction. The center of the hole 22 is the barycenter of a plan-view shape of the hole 22. For the hole 22 having a circular shape in a plan view as illustrated in FIG. 7, the distance between the center of circles is the array pitch.

In a case where the plan-view shape of the hole 22 is a circle or approximates to a circle, the center of the circle formed by the hole 22 is identified as follows. First, three points that are located on the contour of the hole 22 and distanced from one another at an angle of approximately 120° in terms of central angle are determined. The three points may be determined manually by a person who performs measurement or determined automatically by a measurement apparatus. Next, a circle that goes through the determined three points is computed by, for example, performing image processing. The computed center of the circle is taken as the center of the hole 22. For finding such a circle, a digital microscope VHX-6000 manufactured by Keyence Corporation is used.

For finding the center of the hole 22 and measuring the array pitch of the holes 22, the shape of each hole 22 formed as a through hole is identified as that of a portion that goes through the decorative layer 30 in projection in the third direction D3, as done in the finding of the aperture ratio described earlier. When the calculation of the aperture ratio described earlier is performed, the area size of the hole 22 having a circular shape is found after finding the center of the circular shape and the diameter thereof as described here.

The average of the array pitch of the holes 22 and the standard deviation of the array pitch of the holes 22 are values found based on a finite number of array-pitch measurement values each about arbitrarily-selected two holes 22 located next to each other in a particular array direction. Specifically, based on array-pitch measurement values measured at thirty points about the holes 22 arranged in a particular array direction, the average $A_{A1}$, $A_{A2}$ of the array pitch and the standard deviation $\sigma_{A1}$, $\sigma_{A2}$ of the array pitch are found. Measurement is performed at thirty points also when determining whether conditions (G) and (H) to be described later are met or not, as done when determining whether the conditions (A) to (F) are met or not.

By finding the average of the array pitch of the holes 22 arranged in each array direction, the first array direction DA1, in which the average of the array pitch is the least value, and the second array direction DA2, in which the average of the array pitch is the second least value, are found. In FIG. 7, the first array direction DA1, in which the average of the array pitch is the least value, the second array direction DA2, in which the average of the array pitch is the second least value, and the third array direction DA3, in which the average of the array pitch is the third least value, are illustrated. Usually, the angle formed between the first array direction DA1 and the second array direction DA2 is 45° or greater and is prone to be 60° or greater. From the viewpoint of preventing unbalanced plan-view distribution of the holes, the angle formed between the first array direction DA1 and the second array direction DA2 should preferably be 60° or greater and 90° or less.

In the example illustrated in FIG. 7, all of the first to third array directions DA1, DA2, and DA3 are inclined with respect to the first direction D1 and the second direction D2. In the illustrated example, the first pixel array direction DP1, in which the pixels of the display device 10 are arranged, is parallel to the first direction D1 (see FIG. 5). Similarly, the second pixel array direction DP2, in which the pixels of the display device 10 are arranged, is parallel to the second direction D2. That is, in the example illustrated in FIG. 7, the first to third array direction DA1, DA2, DA3 regarding the holes 22 is inclined with respect to the pixel array direction DP1, DP2 regarding the pixels. Inclining the array direction of the holes 22 with respect to the array direction of the pixels 16A, 16B, 16C makes it possible to suppress the occurrence of a fringe pattern.

Next, an example of a method of manufacturing the decorative sheet 20 having the structure described above will now be described.

First, a film material 25A (see FIG. 8) that is to form the substrate 25 is prepared. A transparent film material made of resin to be used as the substrate 25 described earlier can be used the film material 25A. A base decorative layer 30C that is to form the decorative layer 30 is formed on the film material 25A. In the specific example described above, the decorative layer 30 includes the design layer 32 and the light shielding layer 34. When the decorative sheet 20 is manufactured, as will be described next, the base decorative layer 30C may include a base design layer 32A, which is used for forming the design layer 32, and a base light shielding layer 34A, which is used for forming the light shielding layer 34.

First, ink that is to form the light shielding layer 34 is applied onto the film material 25A. Next, the ink on the film material 25A is solidified by drying it. The base light shielding layer 34A is formed through the above process on the film material 25A. Unlike the light shielding layer 34, the holes 22 are not formed in the obtained base light shielding layer 34A. An applying apparatus such as a printing machine is used for forming the base light shielding layer 34A.

Figure 8:
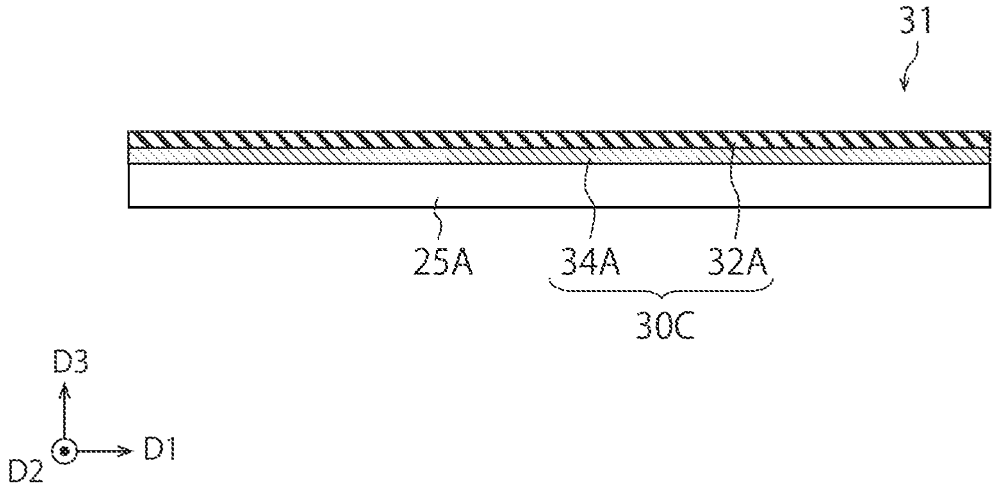
FIG. 8 is a diagram illustrating an example of a method of manufacturing a decorative sheet that can be included in the decorative-sheet-attached display device illustrated in FIG. 1.

The base design layer 32A is thereafter formed on the base light shielding layer 34A by printing, transfer, or the like. Unlike the design layer 32, the base design layer 32A is formed as a layer in which the holes 22 are not formed. Through the above processes, as illustrated in FIG. 8, a laminated body 31 formed by stacking the base light shielding layer 34A and the base design layer 32A in this order on the film material 25A can be obtained. An applying apparatus such as a printing machine, or a transfer apparatus, is used for forming the base design layer 32A.

Figure 9:
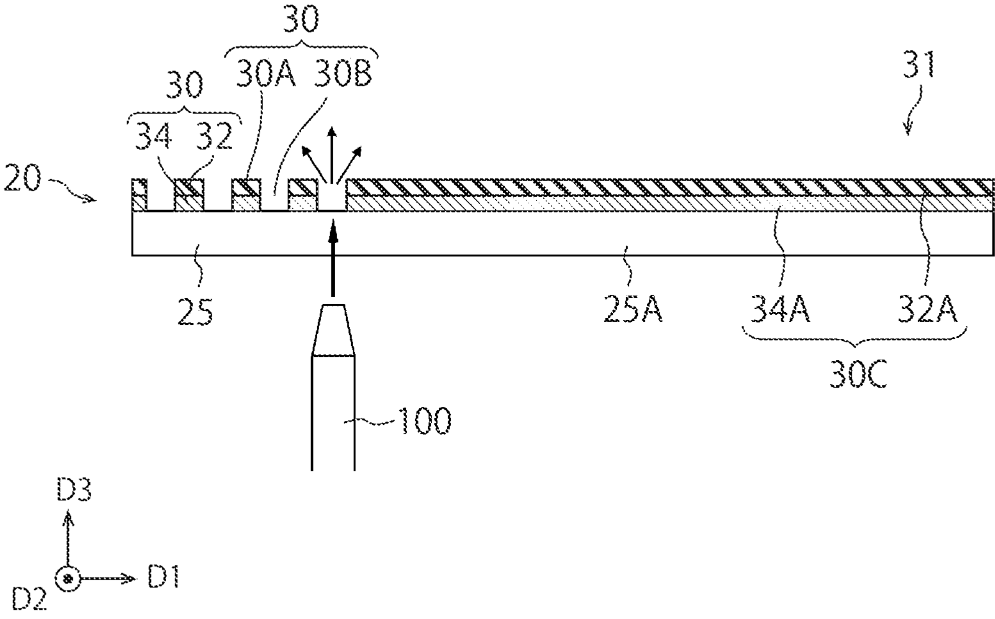
FIG. 9 is a diagram illustrating an example of a method of manufacturing a decorative sheet that can be included in the decorative-sheet-attached display device illustrated in FIG. 1.

Next, the holes 22 are formed in the base decorative layer 30C. The illustrated base decorative layer 30C includes the base design layer 32A and the base light shielding layer 34A. In this example, the holes 22 may be formed in the base design layer 32A and the base light shielding layer 34A. For example, as illustrated in FIG. 9, it is possible to form the holes 22 by applying laser light to positions in the laminated body 31 where the holes 22 are to be formed and thereby removing the base design layer 32A and the base light shielding layer 34A at the laser-irradiated area. As illustrated in FIG. 9, the laser light may be applied to, of the laminated body 31, a surface located closer to the film material 25A. The laser light having passed through the film material 25A is applied to the base decorative layer 30C. The laser light passes through the film material 25A and is then absorbed by the base light shielding layer 34A efficiently. This causes the melting of the base light shielding layer 34A and the evaporation of it together with the base design layer 32A adjoining it. The holes 22 are formed by the laser irradiation. The design layer 32 is obtained from the base design layer 32A in which the holes 22 have been formed. The light shielding layer 34 is obtained from the base light shielding layer 34A in which the holes 22 have been formed. The decorative sheet 20 that includes the decorative layer 30 formed on the substrate 25 made of the film material 25A is obtained in this way.

The laser-light absorption of the film material 25A, and the laser-light absorption of the substrate 25 obtained from the film material 25A, may be less than the laser-light absorption of the base decorative layer 30C, and the laser-light absorption of the decorative layer 30 obtained from the base decorative layer 30C. In the illustrated example, the laser-light absorption of the film material 25A, and the laser-light absorption of the substrate 25 obtained from the film material 25A, may be less than the laser-light absorption of the base light shielding layer 34A, and the laser-light absorption of the light shielding layer 34 obtained from the base light shielding layer 34A. The laser-light absorption of the base decorative layer 30C, and the laser-light absorption of the decorative layer 30 obtained from the base decorative layer 30C, may be 3% or greater, 5% or greater, or 10% or greater. The laser-light absorption of the base light shielding layer 34A, and the laser-light absorption of the light shielding layer 34 obtained from the base light shielding layer 34A, may be 3% or greater, 5% or greater, or 10% or greater. These examples make it possible to form the holes 22 efficiently and stably by applying the laser light having passed through the film material 25A to the base decorative layer 30C.

In the illustrated example, the decorative layer 30 includes the design layer 32 and the light shielding layer 34. The light shielding layer 34 is located between the design layer 32 and the substrate 25. The light shielding layer 34 is in contact with the substrate 25. The base decorative layer 30C includes the base design layer 32A and the base light shielding layer 34A. The base light shielding layer 34A is located between the base design layer 32A and the film material 25A. The base light shielding layer 34A is in contact with the film material 25A. With this example, it is possible to form the holes 22 efficiently and stably in the base decorative layer 30C by means of the laser light having passed through the film material 25A.

Figure 12:
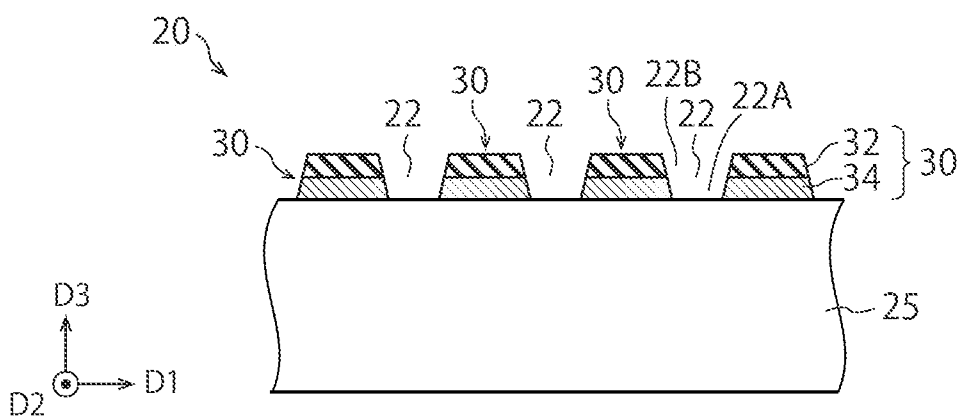
FIG. 12 is a lateral cross-sectional view illustrating another example of the decorative sheet.

In the decorative layer 30 obtained from the base decorative layer 30C by applying the laser light having passed through the film material 25A thereto, as illustrated in FIG. 12, it is possible to make a width in the array direction of the holes 22 (for example, the first array direction DA1 or the second array direction DA2) at a base end portion 22A, which is closer to the substrate 25 in the third direction D3, less than said width at a distal end portion 22B, which is farther from the substrate 25 in the third direction D3. As illustrated in FIG. 12, the width of the hole 22 at the light shielding layer 34 may be configured to be less than the width of the hole 22 at the design layer 32. The width in the array direction of the holes 22 (for example, the first array direction DA1 or the second array direction DA2) may be configured to decrease gradually from the distal end portion 22B, which is farther from the substrate 25 in the third direction D3, toward the base end portion 22A, which is closer to the substrate 25 in the third direction D3. This example makes it easier for the decorative layer 30, for example, the light shielding layer 34, to absorb external light having traveled into the hole 22. This makes it possible to, with high contrast, display an image and visually present a design.

Figure 10:
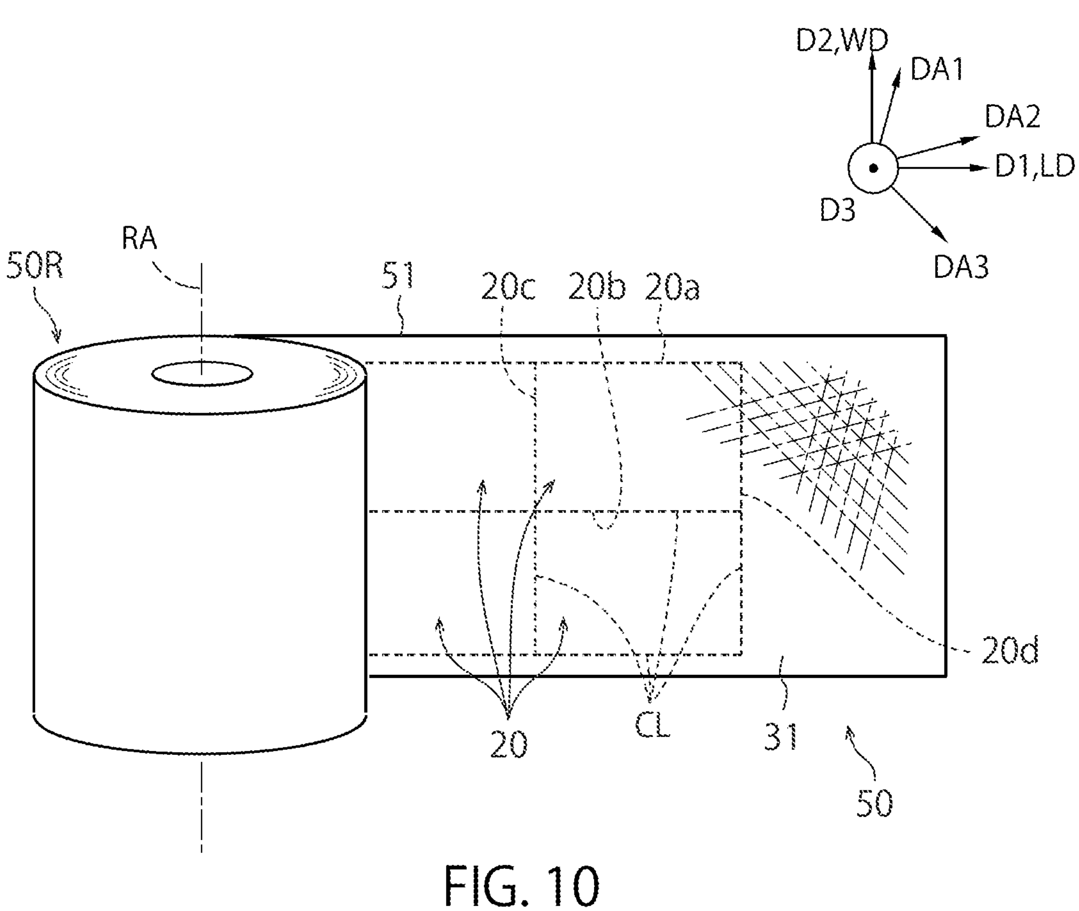
FIG. 10 is a diagram illustrating a sheet article used for manufacturing the decorative sheet illustrated in FIG. 1.

With production efficiency considered, it is preferable to manufacture an elongated laminated body 31 and form the holes 22 by applying laser light to the elongated laminated body 31. That is, it is preferable in terms of production efficiency to manufacture an elongated sheet article 50 that includes the decorative layer 30 and the substrate 25 as illustrated in FIG. 10 by means of a so-called roll-to-roll scheme. The sheet article 50 illustrated in FIG. 10 is a sheet-type member that is elongated in a length direction LD. The sheet article 50 is wrapped around a roll axis RA that is not parallel to the length direction LD and can be handled in the form of a roll 50R. In the illustrated example, the roll axis RA is perpendicular to the length direction LD. The decorative sheet 20 can be obtained by unreeling the sheet article 50 out of the roll 50R and then cutting the unreeled sheet article 50. That is, the sheet article 50 is configured such that the decorative sheets 20 are connected seamlessly to the other portion, and the individual decorative sheets 20 can be obtained by cutting them out of the sheet article 50.

With the yield of the sheet article 50 considered, it is preferable to cut the sheet article 50 along cut lines CL in a width direction WD orthogonal to the length direction LD. Moreover, it is anticipated that the neighborhood of a pair of width-directional edges 51 extending in the length direction LD of the sheet article 50 could be damaged during handling such as storage or transportation of the sheet article 50 or the roll 50R. Therefore, as illustrated in FIG. 10, each decorative sheet 20 may be cut out of the sheet article 50 such that the decorative sheet 20 does not include the width-directional edge 51. In the example illustrated in FIG. 10, the first edge 20*a* and the second edge 20*b*, which are the longer sides of the decorative sheet 20, are parallel to the length direction LD of the sheet article 50. The third edge 20*c* and the fourth edge 20*d*, which are the shorter sides of the decorative sheet 20, are parallel to the width direction WD of the sheet article 50. With the method of cutting the decorative sheets 20 out of the sheet article 50 illustrated in FIG. 10, a high yield can be expected.

Figure 11:
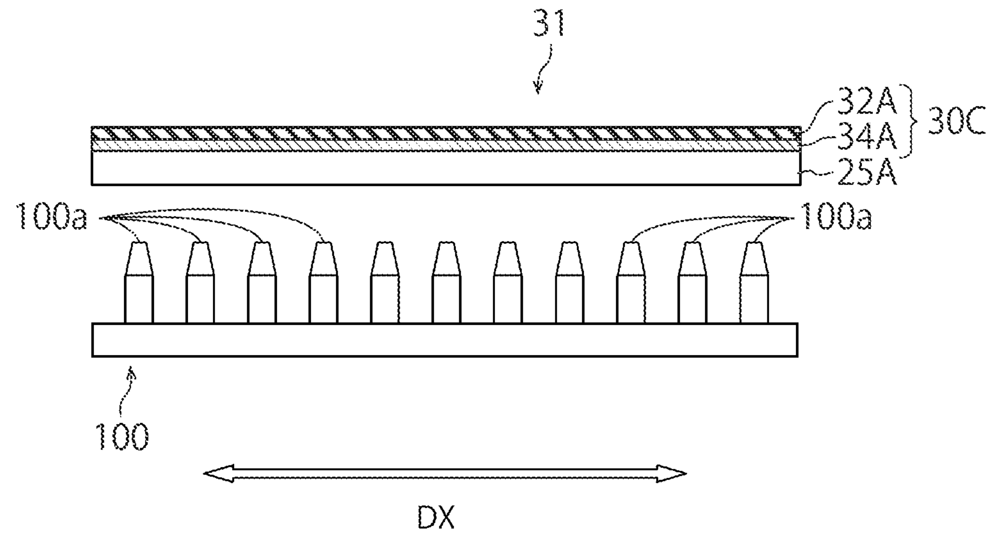
FIG. 11 is a diagram illustrating a modification example of a laser irradiation apparatus used for manufacturing the decorative sheet illustrated in FIG. 1.

When a plurality of decorative sheets 20 is taken out of the sheet article 50 as illustrated in FIG. 10, a laser irradiation apparatus 100 illustrated in FIG. 11 can be used. The laser irradiation apparatus 100 illustrated in FIG. 11 has a plurality of irradiation ports 100*a*. The plurality of irradiation ports 100*a* is arranged in an array direction DX. In the illustrated example, the interval of the plurality of irradiation ports 100*a* along the array direction DX is fixed. The laser irradiation apparatus 100 illustrated in FIG. 11 is capable of forming a plurality of holes 22 simultaneously in the laminated body 31 facing it. It is possible to form the holes 22 in the laminated body 31 by performing relative movement of the laminated body 31 with respect to the laser irradiation apparatus 100 and emitting laser light intermittently from the irradiation ports 100*a* of the laser irradiation apparatus 100.

In the laser irradiation apparatus 100 illustrated in FIG. 11, the laser light does not necessarily have to be emitted simultaneously from the plurality of irradiation ports 100*a*. The timing of emission of laser light from the plurality of irradiation ports 100*a* may be different. The laser light may be emitted sequentially at asynchronous timing from each of the plurality of irradiation ports 100*a*. The irradiation port 100*a* from which the laser light is emitted may change sequentially in the array direction DX. That is, the irradiation port 100*a* from which the laser light is emitted may change sequentially from the irradiation ports 100*a* located at a first side in the array direction DX toward the irradiation ports 100*a* located at a second side that is the opposite of the first side. Two or more irradiation ports 100*a* constituting a part of the plurality of irradiation ports 100*a* may have the same laser light emission period, partially the same laser light emission period, or completely different laser light emission periods.

In the manufacturing of the sheet article 50, the array direction DX of the irradiation ports 100*a* may be inclined with respect to both the width direction WD and the length direction LD of the laminated body 31 that is to form the sheet article 50. Moreover, the laminated body 31 may be moved relatively with respect to the laser irradiation apparatus 100 not only in the length direction LD but also in the width direction WD of the laminated body 31. With this arrangement and transportation, as illustrated in FIG. 10, the holes 22 formed in the sheet article 50 can have arrays in the array directions DA1, DA2, and DA3 that are inclined with respect to both the length direction LD and the width direction WD of the sheet article 50. That is, in the decorative sheet 20 included in the sheet article 50, the first array direction DA1 of the holes 22 can be inclined with respect to the length direction LD of the sheet article 50. In the decorative sheet 20 included in the sheet article 50, the second array direction DA2 of the holes 22 can also be inclined with respect to the length direction LD of the sheet article 50. In other words, the first array direction DA1 and the second array direction DA2 can be not perpendicular to the length direction LD nor parallel to the length direction LD. In the decorative sheet 20 included in the roll 50R, the first array direction DA1 of the holes 22 can be inclined with respect to the roll axis RA of the roll 50R. In the decorative sheet 20 included in the roll 50R, the second array direction DA2 of the holes 22 can also be inclined with respect to the roll axis RA of the roll 50R. When combined with the display device 10 illustrated in FIG. 5, the decorative sheet 20 cut out of the roll 50R or the sheet article 50 described above at a high yield as illustrated in FIG. 10 makes it easier to incline the first array direction DA1 and the second array direction DA2 with respect to the pixel array direction DP1, DP2. Therefore, the obtained decorative sheet 20 makes it possible to sufficiently suppress the occurrence of a fringe pattern when combined with a general display device 10.

In the manufacturing of the decorative sheet 20 illustrated in FIG. 6C, ink that is to form the cover layer 36 is applied onto the produced decorative layer 30. Next, the ink having been applied onto the decorative layer 30 is dried for solidification, thereby producing the cover layer 36 on the decorative layer 30.

By the way, the decorative sheet 20 and the sheet article 50 according to the present embodiment meet the conditions (A) to (F) described earlier. The decorative sheet 20 and the sheet article 50 may further meet the conditions (G) and (H) to be described later. By contrast, not all of the conditions (A) to (F) are met by a decorative sheet and a sheet article according to related art. A decorative sheet 20 and a sheet article 50 according to related art having uniform hole arrangement do not meet the conditions (E) and (F) because there is little variation in the arrangement of the holes. A decorative sheet and a sheet article according to related art having irregular hole arrangement do not meet the conditions (C) and (D). In the decorative sheet and the sheet article according to related art having irregular hole arrangement, there is too much variation in the arrangement of the holes to meet the conditions (C) and (D).

Figure 13:
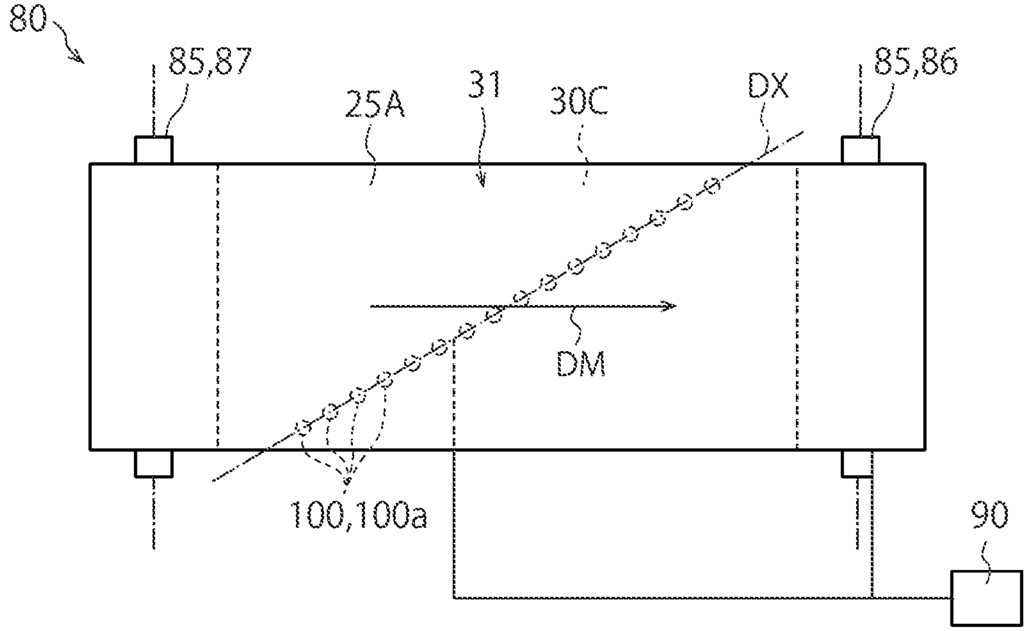
FIG. 13 is a top view schematically illustrating a decorative sheet manufacturing apparatus.

To address this issue, the inventors of the present application confirmed that it is possible to manufacture the decorative sheet 20 and the sheet article 50 that meet all of the conditions (A) to (F) by using a decorative sheet manufacturing apparatus 80 and the laser irradiation apparatus 100 illustrated in FIGS. 11 and 13. Specifically, the holes 22 are formed in the laminated body 31 sequentially by relative movement of the laminated body 31 with respect to the laser irradiation apparatus 100. When this is performed, the laminated body 31 is moved relatively with respect to the laser irradiation apparatus 100 in a direction that is not parallel to the array direction DX of the irradiation ports 100*a*, that is, in a direction DM that is inclined with respect to the array direction DX or orthogonal to the array direction DX, and laser light is emitted intermittently from the irradiation ports 100*a*. In addition, either a speed of the relative movement of the laminated body 31 with respect to the laser irradiation apparatus 100 or time intervals at which laser light is emitted from the irradiation port 100*a* is, or both are, varied.

Combining the varying of the relative movement speed and/or the varying of the irradiation time intervals with the laser irradiation apparatus 100 that includes the plurality of irradiation ports 100*a* arranged at fixed intervals makes it possible to manufacture the decorative sheet 20 and the sheet article 50 that meet the conditions (A) to (F) and further meet the conditions (G) and (H). Displacing the plurality of irradiation ports 100*a* to some extent in such a way as to make their intervals non-uniform is also effective for enabling the decorative sheet 20 to meet the conditions (A) to (F) and further meet the conditions (G) and (H).

Varying the irradiation time intervals of the laser light from the irradiation port 100*a* means that either a time interval from the timing of starting laser light irradiation from the irradiation port 100*a* to the timing of starting laser light irradiation next or a time interval from the timing of stopping laser light irradiation from the irradiation port 100*a* to the timing of starting laser light irradiation next is, or both are, varied.

The varying of the relative movement speed and the varying of the irradiation time intervals may be executed concurrently, may be executed concurrently only in a part of a period, or may be executed in completely different periods. Executing the varying of the relative movement speed and the varying of the irradiation time intervals concurrently makes it possible to weaken the regularity in the arrangement of the holes 22. This makes it easier to manufacture the decorative sheet 20 and the sheet article 50 that meet the conditions (A) to (F) and further meet the conditions (G) and (H).

The laminated body 31 may be moved relatively with respect to the laser irradiation apparatus 100 in a direction that is inclined with respect to the array direction DX of the irradiation ports 100*a*, and laser light may be emitted intermittently from the irradiation ports 100*a*. With this example, it is possible to weaken the regularity in the arrangement of the holes 22. This makes it easier to manufacture the decorative sheet 20 and the sheet article 50 that meet the conditions (A) to (F) and further meet the conditions (G) and (H).

The array pitch of the holes 22 in a direction parallel to the direction DM of the relative movement of the laminated body 31 with respect to the laser irradiation apparatus 100 may be different from the array pitch of the irradiation ports 100*a*. This example also makes it easier for at least one of the first array direction DA1 and the second array direction DA2 to be non-parallel to both the array direction DX of the irradiation ports 100*a* and the direction DM of the relative movement of the laminated body 31 with respect to the laser irradiation apparatus 100.

Furthermore, the array pitch of the holes 22 in a direction parallel to the direction DM of the relative movement of the laminated body 31 with respect to the laser irradiation apparatus 100 may be greater than the array pitch of the irradiation ports 100*a*. This example makes it easier for both the first array direction DA1 and the second array direction DA2 to be inclined with respect to the direction DM of the relative movement of the laminated body 31 with respect to the laser irradiation apparatus 100. With this example, when combined with the display device 10 illustrated in FIG. 5, the decorative sheet 20 cut out of the roll 50R or the sheet article 50 described above at a high yield as illustrated in FIG. 10 makes it easier to incline the first array direction DA1 and the second array direction DA2 with respect to the pixel array direction DP1, DP2. Therefore, the obtained decorative sheet 20 makes it possible to sufficiently suppress the occurrence of a fringe pattern when combined with a general display device 10.

The following decorative sheet manufacturing apparatus can be taken as an example of a decorative sheet manufacturing apparatus that forms holes by laser irradiation: for example, the apparatus includes: a transportation unit that transports a laminated body that includes a film material and a base decorative layer in which a design is formed; a laser irradiation apparatus that has a plurality of irradiation ports and applies laser light intermittently from the plurality of irradiation ports onto the laminated body transported by the transportation unit; and a control unit that controls the transportation unit and the laser irradiation apparatus; wherein the plurality of irradiation ports is arranged in a direction that is not parallel to a direction of relative movement of the laminated body transported by the transportation unit with respect to the laser irradiation apparatus, and the control unit varies either a speed of the relative movement of the laminated body with respect to the laser irradiation apparatus or irradiation time intervals of the laser light from the irradiation ports, or both of the speed of the relative movement of the laminated body with respect to the laser irradiation apparatus and the irradiation time intervals of the laser light from the irradiation ports.

In the above apparatus, the laser irradiation apparatus may be disposed such that the laser light having passed through the film material is applied to the base decorative layer.

FIG. 13 illustrates an example of the decorative sheet manufacturing apparatus 80. The manufacturing apparatus 80 includes a transportation unit 85, the laser irradiation apparatus 100, and a control unit 90. The decorative sheet manufacturing apparatus 80 may include an applying apparatus (coating machine) or a transfer apparatus for forming the base decorative layer 30C of the laminated body 31.

The transportation unit 85 transports the laminated body 31 that includes the film material 25A and the base decorative layer 30C. The transportation unit 85 may include a driving roller 86 configured to reel the laminated body 31 and a driven roller 87 configured to unreel the laminated body. The transportation unit 85 may transport the laminated body 31 in a direction DM that is not parallel to the array direction DX of the irradiation ports 100*a* of the laser irradiation apparatus 100, for example, in a direction DM that is inclined with respect to the array direction DX or that is orthogonal to the array direction DX.

The control unit 90 may be electrically connected to the transportation unit 85 and the laser irradiation apparatus 100. The control unit 90 may control the transportation unit 85 and the laser irradiation apparatus 100. The transportation unit 85 may vary the speed of the relative movement of the laminated body 31 with respect to the laser irradiation apparatus 100 in accordance with control from the control unit 90. The laser irradiation apparatus 100 may vary the irradiation time intervals of laser light in accordance with control from the control unit 90.

The control unit 90 may be a computer that includes a processing unit such as a CPU (processor) and a storage unit such as a RAM. A computer program defining the processing procedures of the decorative sheet manufacturing apparatus 80 may be stored in the storage unit. The processing unit may implement the varying of the relative movement speed of the laminated body and/or the varying of the irradiation time intervals of laser light described above by running the program stored in the storage unit.

Next, the operational effects of the decorative-sheet-attached display device 1 will now be described.

When the display device 10 is in a non-display state and the display surface 11 is therefore in a non-emitting state, as illustrated in FIG. 1, the decorative sheet 20 covering the display surface 11 is viewed. It is possible to hide the display device, which usually looks black when in a non-display state, by means of the decorative sheet 20. In the decorative sheet 20 illustrated in FIG. 6A, the design layer 32 of the decorative layer 30 is viewed directly. In the decorative sheet 20 illustrated in FIG. 6B, the design layer 32 of the decorative layer 30 is viewed through the cover layer 36 that is transparent. In the example illustrated in FIG. 6C, the design layer 32 of the decorative layer 30 is viewed through the substrate 25 that is transparent. Thanks to rich expression by printing or the like, the design layer 32 forms an excellent design. Design expression of the decorative sheet 20 using the decorative layer 30 makes it possible to install the display device 10 while ensuring harmonization and unity with an ambient environment. Nowadays, the scope of use of the display device 10 is expanding rapidly. Using the decorative sheet 20 makes it possible to apply the display device 10 to uses in which design quality is important such as the interior of an automobile, the interior of a building, furniture, home appliances, and the like.

When the display device 10 is in a display state, image light goes out from the display surface 11. The image light having gone out from the display surface 11 passes through the substrate 25 toward the decorative layer 30. The image light having entered the transmissive portion 30B of the decorative layer 30 passes through the decorative layer 30 and goes out from the decorative sheet 20 toward the viewing person. As illustrated in FIG. 4, the image light passing through the decorative sheet 20 forms an image displayed on the display surface 11. In the example illustrated in FIG. 4, an alphabet "D" is displayed.

Of the image light, a part that goes toward the decorative portion 30A of the decorative layer 30 is absorbed by the light shielding layer 34, which is located closer to the display device 10 than the design layer 32 is. That is, the image light having gone out from the display surface 11 does not pass through the decorative portion 30A. Therefore, the image light is never illuminated on the design layer 32 from behind. This makes it possible to suppress the occurrence of a color mixture of the image displayed on the display surface 11 with the design formed on the decorative portion 30A of the decorative sheet 20. Moreover, it is possible to suppress the design of the design layer 32 from being visually noisy when image display is performed on the display surface 11. This makes it possible to clearly view the image displayed on the display surface 11 when the display device 10 is in a display state.

In related art, a fringe pattern was sometimes visually noticed on the decorative sheet 20 while the display device 10 is displaying an image. The fringe pattern does not have any relevance to a design presented visually by the decorative sheet nor any relevance to an image displayed by the display device. The fringe pattern spreads over a relative wide area ranging from several centimeters to a dozen of centimeters. The fringe pattern includes a plurality of streaks arranged at a pitch visible with the naked eye. Each of the streaks extends linearly in a direction intersecting with the array direction thereof. The pattern of the fringe pattern varies in accordance with a combination of the decorative sheet and the display device. The inventors conducted diligent studies on this issue. Through the studies, the inventors guessed that moiré caused due to interference between the regularity in the arrangement of the holes 22 in the decorative layer 30 and the regularity in the arrangement of the pixels in the display device 10 is visually noticed as a fringe pattern. As a solution to this issue, the inventors found that it is possible to sufficiently suppress the occurrence of a fringe pattern by meeting the conditions (A) to (F) regarding the arrangement of the holes 22, as demonstrated by Examples to be described later.

$$40 \le A_{A1} \le 400 \tag{A}$$

$$40 \le A_{A2} \le 400 \tag{B}$$

$$3 \times \sigma_{A1} \le 20 \tag{C}$$

$$3 \times \sigma_{A2} \le 20 \tag{D}$$

$$0.0060 \le \sigma_{A1}/A_{A1} \tag{E}$$

$$0.0060 \le \sigma_{A2}/A_{A2} \tag{F}$$

In the present embodiment, the holes 22 are arranged in a plurality of array directions. In the conditions (A), (C), and (E), "$A_{A1}$" denotes the average (μm) of values of the array pitch $P_{A1}$ of the holes 22 arranged in the first array direction DA1, in which said array pitch of the holes 22 has the least value among the plurality of array directions, and "$\sigma_{A1}$" denotes the standard deviation $\sigma_{A1}$ (μm) of the array pitch $P_{A1}$ of the holes 22 arranged in the first array direction DA1. In the conditions (B), (D), and (F), "$A_{A2}$" denotes the average (μm) of values of the array pitch Paz of the holes 22 arranged in the second array direction DA2, in which said array pitch of the holes 22 has the second least value among the plurality of array directions, and "$\sigma_{A2}$" denotes the standard deviation $\sigma_{A2}$ (μm) of the array pitch $P_{A2}$ of the holes 22 arranged in the second array direction DA2.

The average $A_{A1}$, $A_{A2}$ of the array pitch $P_{A1}$, $P_{A2}$ Specified by the conditions (A) and (B) enables the decorative sheet 20 to function effectively for fringe pattern suppression when combined with the preferred range of the aperture ratio of the decorative layer 30 described earlier. That is, when the display device 10 is in a display state, the decorative sheet 20 allows image light to pass through itself to such an extent that an image can be viewed. The viewing person is able to view the image displayed on the display surface 11 through the decorative sheet 20. When the display device 10 is in a non-display state, the decorative sheet 20 hides the display surface 11. The viewing person is able to view the design expressed by the decorative layer 30.

When the average $A_{A1}$, $A_{A2}$ of the array pitch $P_{A1}$, $P_{A2}$ specified by the conditions (A) and (B) is adopted, it could happen that a fringe pattern appears in a combination of the array pitch $P_{A1}$, $P_{A2}$ of the holes 22 and a general array pitch of the pixels of the display device 10, for example, an array pitch of 40 μm or greater and 500 μm or less. A fringe pattern could appear when the array pitch $P_{A1}$, $P_{A2}$ of the holes 22 is combined with the array pitch of the pixels of the display device 10 that can be used for a mobile entity, for example, 40 μm or greater and 200 μm or less, or with the array pitch of the pixels of the display device 10 that can be used for a home appliance, furniture, etc., for example, 120 μm or greater and 300 μm or less, illustrated in FIGS. 3A to 3C.

The requirements specified in the conditions (E) and (F) weaken the regularity in the arrangement of the holes 22. According to the requirements specified in the conditions (E) and (F), the regularity in the arrangement of the holes 22 is disrupted beyond a margin of error occurring in an ordinary manufacturing method when the holes are formed at a fixed pitch. When both the value of "$\sigma_{A1}/A_{A1}$" and the value of "$\sigma_{A2}/A_{A2}$" are 0.0060 or greater as specified by the conditions (E) and (F), it is possible to sufficiently suppress the occurrence of a fringe pattern caused by the regularity in the arrangement of the holes 22 and the regularity in the arrangement of the pixels.

Both the value of "$\sigma_{A1}/A_{A1}$" and the value of "$\sigma_{A2}/A_{A2}$" specified by the conditions (E) and (F) should more preferably be 0.0080 or greater, or still more preferably, 0.020 or greater. As already mentioned, inclining the array direction DA1, DA2 of the holes 22 with respect to the array direction DP1, DP2 of the pixels is effective for fringe pattern suppression. It was confirmed that, with the decorative sheet 20 in which both the value of "$\sigma_{A1}/A_{A1}$" and the value of "$\sigma_{A2}/A_{A2}$" are 0.0080 or greater, it is possible to suppress the occurrence of a fringe pattern by adjusting the array direction DA1, DA2 of the holes 22 with respect to the array direction DP1, DP2 of the pixels. It was further confirmed that, with the decorative sheet 20 in which both the value of "$\sigma_{A1}/A_{A1}$" and the value of "$\sigma_{A2}/A_{A2}$" are 0.020 or greater, sufficient fringe pattern suppression can be achieved even in a case where the array direction DA1, DA2 of the holes 22 is parallel to the array direction DP1, DP2 of the pixels.

In view of the applications of the decorative sheet 20, the aperture ratio of the decorative sheet 20 is set to be very low. It may be safe to say that the occurrence of moiré itself caused by the decorative sheet 20 having such a low aperture ratio is something surprising. Furthermore, as a method for providing a solution to moiré, the value of the ratio of the standard deviation $\sigma_{A1}$, $\sigma_{A2}$ to the average $A_{A1}$, $A_{A2}$ of the pitch, instead of the standard deviation $\sigma_{A1}$, $\sigma_{A2}$, is adjusted. Discovering this issue and proposing a solution to it herein can be said to be remarkable that is beyond a scope predictable from the current level of technology.

In the conditions (E) and (F), the regularity in the arrangement of the holes 22 is weakened. When the arrangement of the holes 22 is irregular, the design presented visually by the decorative layer 30 of the decorative sheet 20 looks uneven. The conditions (C) and (D) limit the degree of weakening the regularity in the arrangement of the holes 22. When both the value of "$3\times\sigma_{A1}$" and the value of "$3\times\sigma_{A2}$" are 20 or less as specified by the conditions (C) and (D), it is possible to suppress the occurrence of design unevenness.

Arranging the holes 22 in a plurality of array directions means that the holes 22 are arranged in two dimensions. When the holes 22 are arranged in two dimensions, it can be said that the holes 22 form arrays in three or more directions. For example, in the example illustrated in FIG. 7, it can be said that the holes 22 are arranged in a direction parallel to another axial line and in a direction parallel to another axial line, too. However, whether or not a fringe pattern or design unevenness occurs is strongly influenced by arrangement in a direction of a short array pitch. Therefore, in the present embodiment, it is possible to sufficiently suppress the occurrence of a fringe pattern and design unevenness by adjusting the arrangement of the holes 22 in the first array direction DA1 and the second array direction DA2.

In addition to the conditions (A) to (F) regarding the arrangement of the holes 22 described above, it is preferable if a condition (G) is met. The condition (G) is a condition regarding the first pitch average $A_{A1}$, the second pitch average $A_{A2}$, the first pitch standard deviation $\sigma_{A1}$, and the second pitch standard deviation $\sigma_{A2}$.

$$|\sigma_{A1}/A_{A1}-\sigma_{A2}/A_{A2}|\leq 0.0010 \quad \text{(G)}$$

When the condition (G) is met, the adjustment of the angle of inclination of the array direction of the holes with respect to the array direction of the pixels is more effective for suppressing the occurrence of a fringe pattern. Moreover, when the upper limit in (G) is met, it is possible to widen the angular range of the orientation of the decorative sheet 20 with respect to the display device 10 in which the occurrence of a fringe pattern can be suppressed, that is, the range of the angle of inclination of the array direction of the holes with respect to the array direction of the pixels. This effect was confirmed to be more prominent when the value of $|\sigma_{A1}/A_{A1}-\sigma_{A2}/A_{A2}|$ is 0.00070 or less.

There is no lower limit value regarding $|\sigma_{A1}/A_{A1}-\sigma_{A2}/A_{A2}|$; said value may be 0 or greater.

The opening area of the hole 22 can be set as appropriate within a range in which the above-described condition of the aperture ratio and the above-described condition regarding the array pitch of the holes 22 are met. However, when the area size of the hole 22 changes significantly, the transmittance of the decorative layer 30 changes locally. In view of this, it is preferable if an average $A_D$ (μm) of values of diameter of the holes 22 and a standard deviation $\sigma_D$ (μm) of the diameter of the holes 22 meet the following condition (H):

$$\sigma_D/A_D\leq 0.080. \quad \text{(H)}$$

In the condition (H), the upper limit value of the ratio of the standard deviation $\sigma_D$ of the diameter of the holes to the average $A_D$ of the diameter of the holes is specified. The upper limit in the condition (H) is determined in such a way as to suppress variation in the in-plane transmittance of the decorative sheet 20 so that unevenness in brightness of the image displayed by the display device 10 can be suppressed sufficiently. That is, in the condition (H), unevenness in brightness of the image is suppressed by setting a limit to the value of variation in the area size of the holes 22. The upper limit of the value of the ratio "$\sigma_D/A_D$" should more preferably be 0.050 or less, or still more preferably, 0.030 or less. The less the standard deviation $\sigma_D$ of the diameter of the holes is, the less likely unevenness in brightness of the image will occur, which is desirable. Therefore, the lower limit of the value of the ratio "$\sigma_D/A_D$" is 0 or greater. To determine the diameter of the hole 22, a circle contouring the hole 22 is found in the same manner as done in the foregoing method of finding the center of the hole 22 having a circular shape, and the value of the diameter of the found circle is taken. That is, the circle, and the diameter of the circle, are found using a digital microscope VHX-6000 manufactured by Keyence Corporation.

In one embodiment having been described above, the decorative sheet 20 includes the decorative layer 30. The holes 22 arranged in a plurality of array directions are provided in the decorative layer 30. The average (μm) $A_{A1}$ of values of the array pitch $P_{A1}$ of the holes 22 arranged in the first array direction DA1, in which said average of the array pitch of the holes 22 is the least value among the plurality of array directions, and the standard deviation $\sigma_{A1}$ (μm) thereof, and the average (μm) $A_{A2}$ of values of the array pitch $P_{A2}$ of the holes 22 arranged in the second array direction DA2, in which said average of the array pitch of the holes 22 is the second least value among the plurality of array directions, and the standard deviation $\sigma_{A2}$ (μm) thereof, meet the conditions (A) to (F). With this one embodiment, it is possible to suppress the occurrence of a fringe pattern when an image displayed by the decorative-sheet-attached display device 1 is viewed.

$$40 \leq A_{A1} \leq 400 \tag{A}$$

$$40 \leq A_{A2} \leq 400 \tag{B}$$

$$3 \times \sigma_{A1} \leq 20 \tag{C}$$

$$3 \times \sigma_{A2} \leq 20 \tag{D}$$

$$0.0060 \leq \sigma_{A1}/A_{A1} \tag{E}$$

$$0.0060 \leq \sigma_{A2}/A_{A2} \tag{F}$$

In one specific example of one embodiment having been described above, the average (μm) $A_{A1}$ of values of the array pitch $P_{A1}$ of the holes 22 arranged in the first array direction DA1, and the standard deviation $\sigma_{A1}$ (μm) thereof, and the average (μm) $A_{A2}$ of values of the array pitch $P_{A2}$ of the holes 22 arranged in the second array direction DA2, and the standard deviation $\sigma_{A2}$ (μm) thereof, meet the condition (G). With this specific example, it is possible to widen the angular range of the orientation of the decorative sheet 20 with respect to the display device 10 in which the occurrence of a fringe pattern can be suppressed.

$$|\sigma_{A1}/A_{A1} - \sigma_{A2}/A_{A2}| \leq 0.0010 \tag{G}$$

Moreover, in one specific example of one embodiment having been described above, the average $A_D$ (μm) of values of diameter of the holes 22 and the standard deviation $\sigma_D$ (μm) of the diameter of the holes 22 meet the condition (H) described above. With this specific example, it is possible to suppress in-plane variation in brightness of the image displayed on the decorative sheet 20.

$$\sigma_D/A_D \leq 0.080. \tag{H}$$

Though one embodiment has been described while referring to the illustrated specific examples, the illustrated specific examples are not intended to limit the one embodiment. The above-described one embodiment can be embodied in the form of various other specific examples, and various kinds of omission, replacement, alteration, addition, and the like can be performed within a range of not departing from its spirit.

One example of modifications will be described below while referring to the drawings. In the description below, and in the drawings referred to in the description below, the same reference signs as those used for the corresponding portions in the specific examples described above will be used for portions that can be configured in the same manner as in the specific examples described above, and duplicative explanation will be omitted.

For example, in the specific examples described above, the decorative layer 30 includes the design layer 32 and the light shielding layer 34. The decorative layer 30 may include either the design layer 32 only or the light shielding layer 34 only. The decorative layer 30 may include another layer in addition to the design layer 32 and the light shielding layer 34.

Figure 14A:
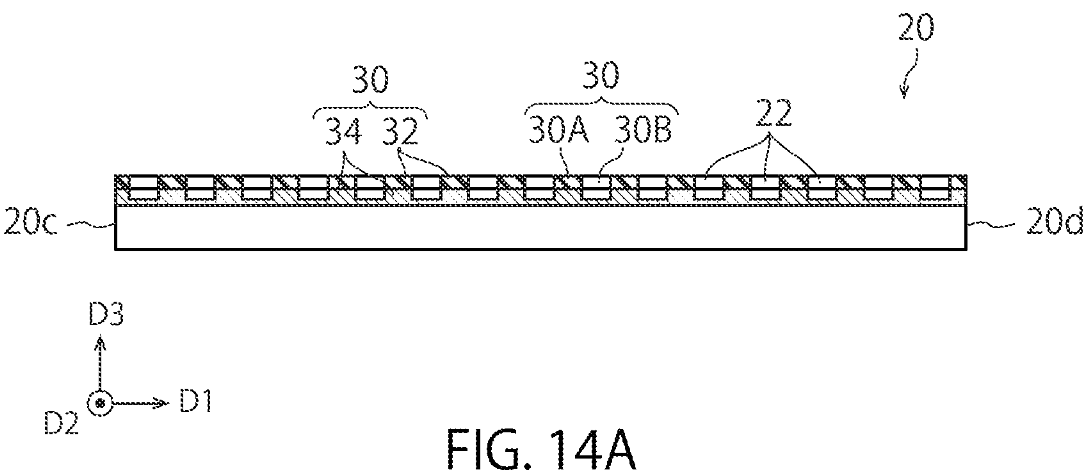
FIG. 14A is a lateral cross-sectional view illustrating another example of the decorative sheet.
Figure 14B:
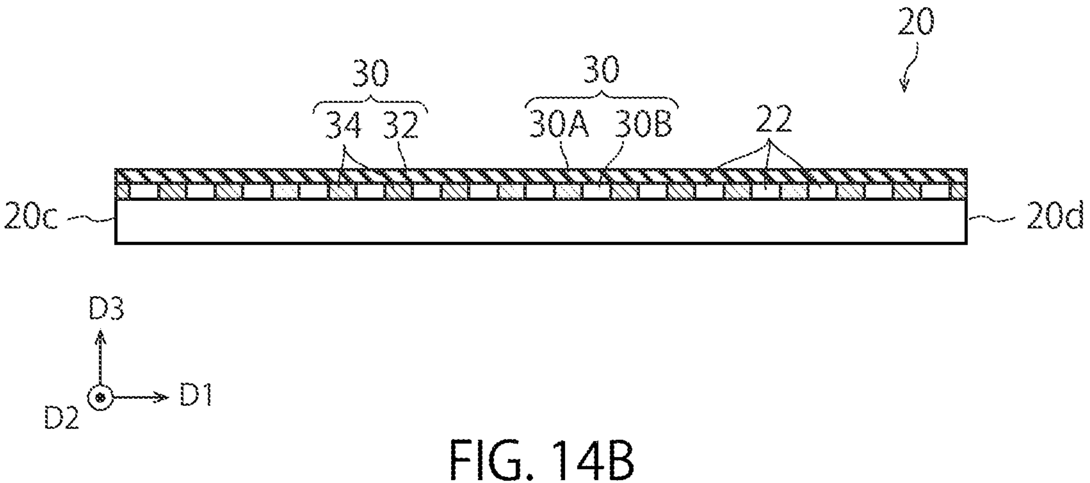
FIG. 14B is a lateral cross-sectional view illustrating another example of the decorative sheet.
Figure 14C:
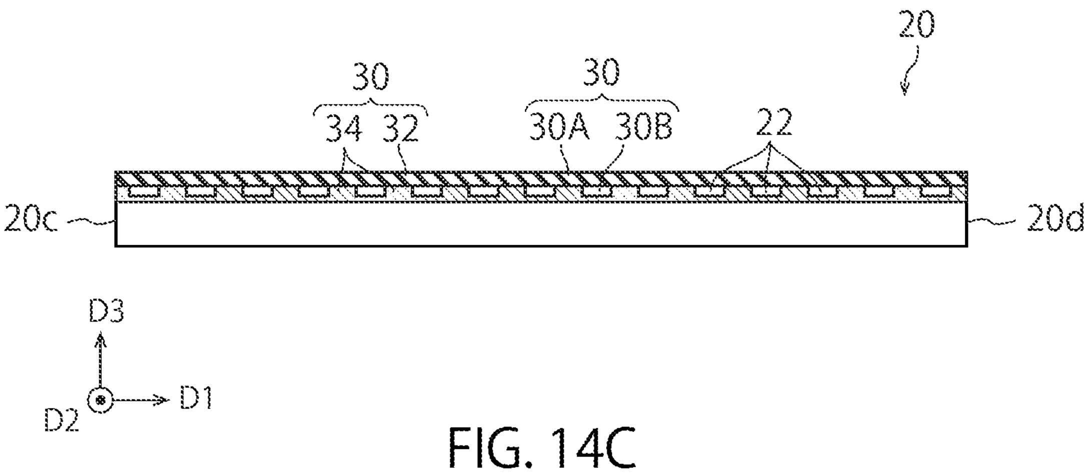
FIG. 14C is a lateral cross-sectional view illustrating another example of the decorative sheet.
Figure 15A:
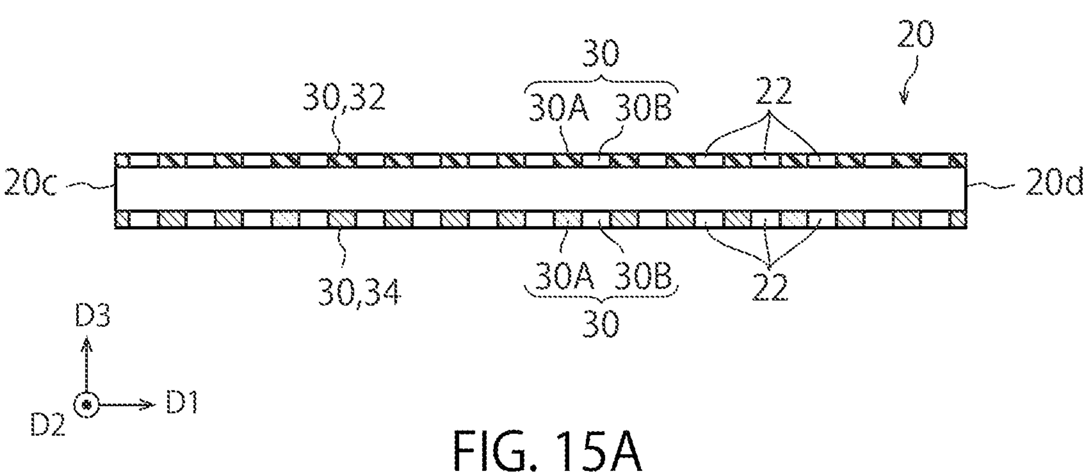
FIG. 15A is a lateral cross-sectional view illustrating another example of the decorative sheet.
Figure 15B:
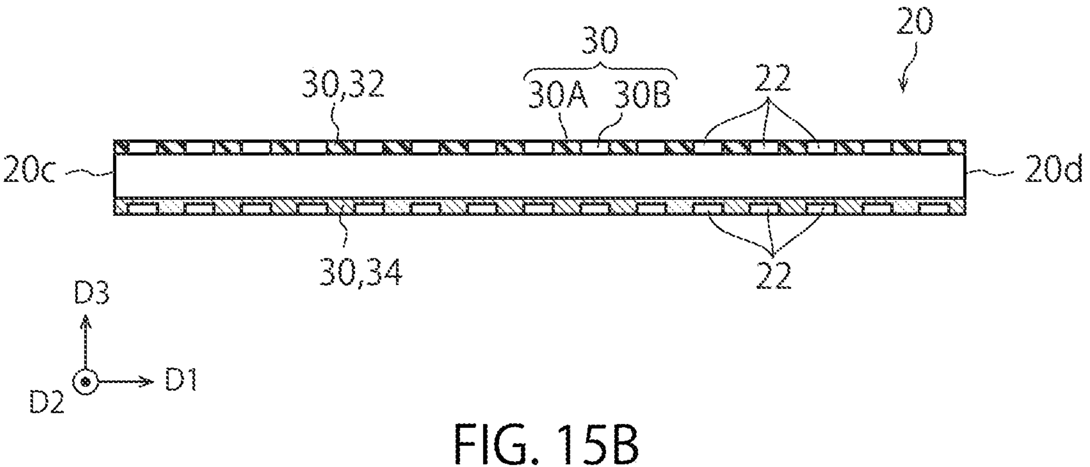
FIG. 15B is a lateral cross-sectional view illustrating another example of the decorative sheet.
Figure 15C:
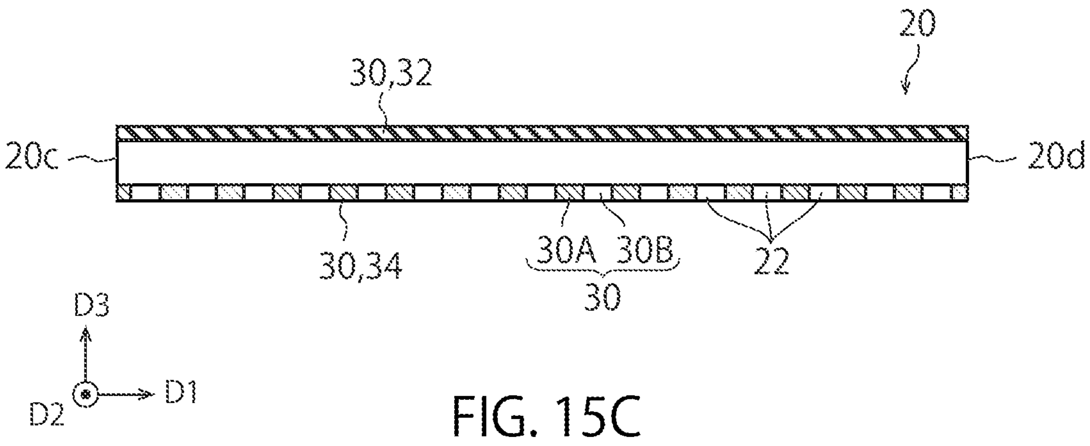
FIG. 15C is a lateral cross-sectional view illustrating another example of the decorative sheet.
Figure 15D:
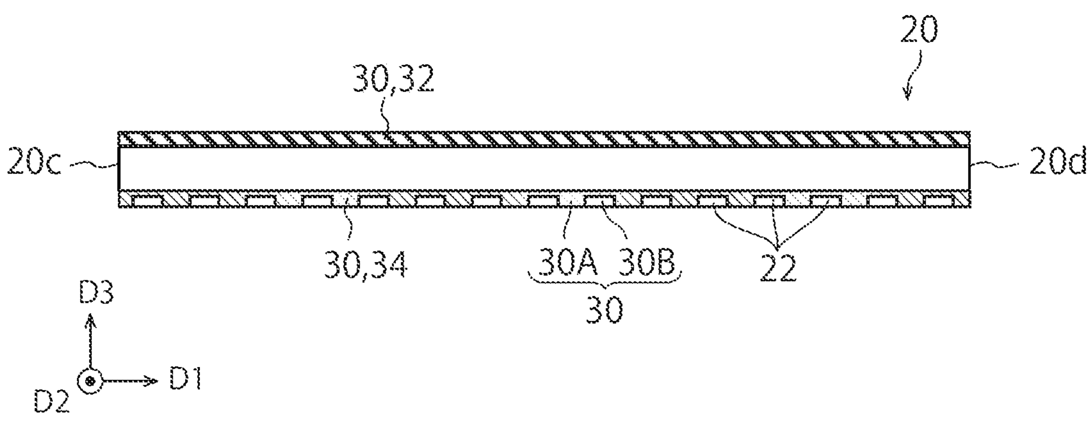
FIG. 15D is a lateral cross-sectional view illustrating another example of the decorative sheet.

In the foregoing examples illustrated in FIGS. 6A to 6C, the holes 22 are through holes of the decorative layer 30. As illustrated in FIGS. 6A to 6C, the holes 22 in the foregoing examples extend throughout the entire length in the thickness direction of the decorative layer 30, namely, in the illustrated examples, the third direction D3. That is, the holes 22 in the foregoing examples are holes going all the way through the decorative layer 30. As illustrated in FIGS. 14A to 14C, the holes 22 may extend partially in the thickness direction of the decorative layer 30, namely, in the illustrated examples, the third direction D3. That is, the hole 22 may be a hole that has a bottom. The hole 22 is a portion that enables image light to pass therethrough. Image light passing through the holes 22 enables an image to be viewed. The length of the hole 22 in the thickness direction may be any length as long as an image can be viewed. The length of the hole 22 in the thickness direction, and the value of the ratio of the length of the hole 22 in the thickness direction to the entire thickness of the decorative layer 30, may be adjusted in accordance with the visible light transmittance of the design layer 32.

In the examples illustrated in FIGS. 14A to 14C, the decorative layer 30 includes the design layer 32 and the light shielding layer 34. The holes 22 may extend only partially in the thickness direction of at least one of the design layer 32 and the light shielding layer 34. In the example illustrated in FIG. 14A, the holes 22 extend throughout the entire thickness of the design layer 32 and extend only partially in the thickness direction of the light shielding layer 34. In the examples illustrated in FIGS. 14B and 14C, no hole 22 is provided in the design layer 32. In the examples illustrated in FIGS. 14B and 14C, a design layer 32 that has sufficient visible light transmittance may be used. The visible light transmittance of the design layer 32 may be 5% or greater, 10% or greater, 15% or greater, or 20% or greater. In the example illustrated in FIG. 14B, the holes 22 go all the way through the light shielding layer 34. In the example illustrated in FIG. 14C, the holes 22 extend only partially in the thickness direction of the light shielding layer 34.

As in the examples illustrated in FIGS. 15A to 15D, the design layer 32 and the light shielding layer 34 may be spaced apart from each other in the normal direction D3 of the decorative layer 30. In these examples, the holes 22 may extend only partially in the thickness direction of the design layer 32. In these examples, the holes 22 may extend only partially in the thickness direction of the light shielding layer 34. In the examples illustrated in FIGS. 15A and 15B, the holes 22 are formed in both the design layer 32 and the light shielding layer 34. In the examples illustrated in FIGS. 15C and 15D, the holes 22 are not formed in the design layer 32 but formed in the light shielding layer 34 only. In the examples illustrated in FIG. 15D, the holes 22 extend only partially in the thickness direction of the light shielding layer 34.

Figure 16:
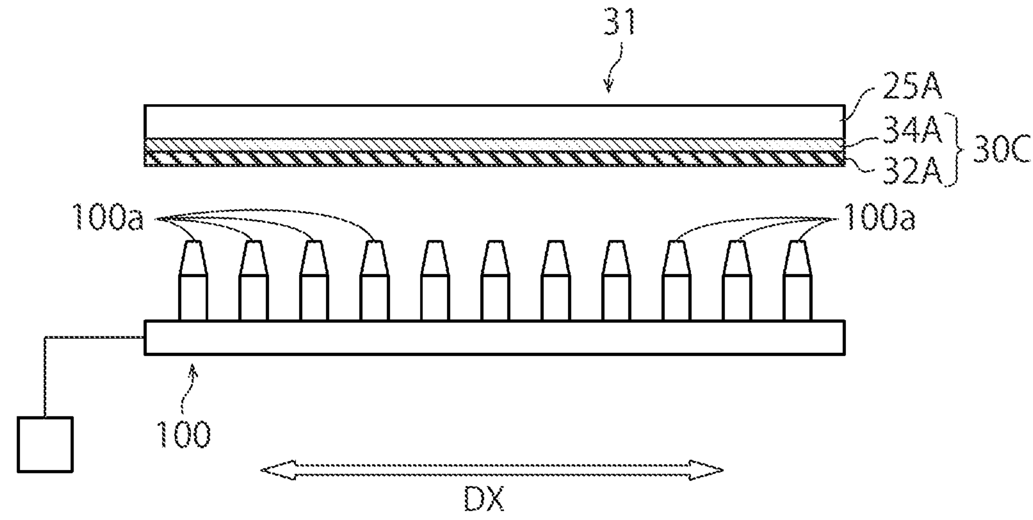
FIG. 16 is a diagram illustrating a modification example of an arrangement of the laser irradiation apparatus used for manufacturing the decorative sheet illustrated in FIG. 1.

In the example illustrated in FIGS. 9 and 11, the film material 25A of the laminated body 31 is located between the base decorative layer 30C of the laminated body 31 and the irradiation ports 100*a* of the laser irradiation apparatus 100 in the layer-stacking direction of the laminated body 31, namely, in the illustrated example, the third direction D3. The film material 25A is located closer to the irradiation ports 100*a* of the laser irradiation apparatus 100 than the base decorative layer 30C is. In this example, the laser light having passed through the film material 25A is applied to the base decorative layer 30C. The arrangement of the laser irradiation apparatus 100 is not limited to the example illustrated in FIGS. 9 and 11, As illustrated in FIG. 16, the base decorative layer 30C of the laminated body 31 may be located between the film material 25A of the laminated body 31 and the irradiation ports 100*a* of the laser irradiation apparatus 100 in the layer-stacking direction of the laminated body 31, namely, in the illustrated example, the third direction D3. The base decorative layer 30C may be located closer to the irradiation ports 100*a* of the laser irradiation apparatus 100 than the film material 25A is. Laser light emitted from the laser irradiation apparatus 100 may be applied to the base decorative layer 30C without entering the film material 25A.

Figure 17:
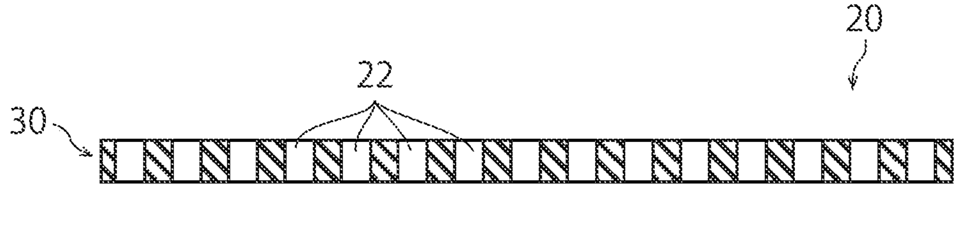
FIG. 17 is a lateral cross-sectional view illustrating another example of the decorative sheet.
Figure 17:

In the foregoing specific examples, the decorative sheet 20 includes the substrate 25 and the decorative layer 30. As illustrated in FIG. 17, the decorative sheet 20 may include, as the decorative layer 30, one or more selected from the group consisting of wood, natural fiber, natural leather, natural stone, synthetic fiber, synthetic leather, and artificial stone. That is, the decorative layer 30 may include one or more selected from the group consisting of wood, natural fiber, natural leather, natural stone, synthetic fiber, synthetic leather, and artificial stone. In the example illustrated in FIG. 17, the decorative layer 30 of the decorative sheet 20 includes a thin plate made of one or more selected from the group consisting of wood, natural fiber, natural leather, natural stone, synthetic fiber, synthetic leather, and artificial stone. The decorative layer 30 has the holes 22 and is thus capable of producing the operational effects described above. The decorative sheet 20 functions as a decoration member.

In the illustrated specific examples, the display device 10 has a plurality of pixels 16A, 16B, and 16C for displaying different colors, but is not limited thereto. The display device 10 may have single-color pixels only. Moreover, the pixel arrangement illustrated in FIG. 5 is just an example. Various pixel arrangement patterns can be adopted.

EXAMPLES

Next, one embodiment having been described above will now be explained in more detail using Examples below. However, one embodiment having been described above shall not be construed to be limited to Examples.

Decorative sheets according to Examples 1 to 7 and decorative sheets according to Comparative Examples 1 to 4 were manufactured as follows.

Comparative Example 1

A metallic decorative sheet was produced by patterning a chromium layer using a laser drawing method. Transparent quartz glass having a thickness of 2.3 mm was used as a substrate supporting the chromium layer. The thickness of the chromium layer was 105 nm. Holes (holes going through a decorative layer) were formed in the chromium layer on the quartz glass using a laser drawing method. The arrangement of the holes was a so-called honeycomb arrangement. That is, the holes were formed in three array directions inclined with respect to one another by 60° at a fixed array pitch mutually identical for these directions. The decorative sheet according to Comparative Example 1 was produced using the same manufacturing method and the same conditions as those of a photomask.

Comparative Example 2

A decorative sheet having a black decorative layer was produced by patterning a positive-type black resist film by etching using a photolithography technique. The decorative sheet produced in Comparative Example 1 was used after the completion of evaluation to be described later as a mask for pattern exposure of the positive-type black resist film. A transparent acrylic film having a thickness of 75 μm was used as a substrate supporting the resist film. The thickness of the resist film was 5 μm.

Examples 1 to 7, Comparative Examples 3 and 4 Decorative sheets according to Examples 1 to 7 and decorative sheets according to Comparative Examples 3 and 4 were produced by using the method which had been described while referring to FIGS. 8 to 11. Specifically, laser light was applied sequentially to a laminated body to form holes and thereby produce the decorative sheet by moving the laminated body relatively with respect to a laser irradiation apparatus. The direction of the relative movement of the laminated body with respect to the laser irradiation apparatus was inclined with respect to the array direction of the irradiation ports of the laser irradiation apparatus. That is, the angle formed by the direction of the relative movement with respect to the array direction of the irradiation ports of the laser irradiation apparatus was greater than 0° but less than 90°. More specifically, the angle formed by the direction of the relative movement with respect to the array direction of the irradiation ports was approximately 60°. Either the speed of the relative movement of the laminated body with respect to the laser irradiation apparatus or irradiation time intervals of the laser light from the laser irradiation apparatus was, or both were, varied. The degree of hole variation was configured to vary from one decorative sheet to another by differentiating how much the speed/ interval is varied among the decorative sheets according to Examples 1 to 7 and Comparative Examples 3 and 4.

A transparent acrylic film having a thickness of 75 μm was used as a substrate supporting the decorative layer 30. The structure of the decorative layer was the same as the structure illustrated in FIG. 6A. The decorative layer was configured to include a light shielding layer and a design layer in this order on the substrate 25. The total thickness of the light shielding layer and the design layer was 5 μm.

Measurement of Each Example

The average (μm) $A_{A1}$ of values of the array pitch $P_{A1}$ of the holes arranged in the first array direction DA1, in which the array pitch of the holes is the shortest, and the standard deviation $\sigma_{A1}$ (μm) thereof, were measured for each of the decorative sheets according to Examples 1 to 7 and Comparative Examples 1 to 4. The measurement results are shown in Table 1. In addition, Table 1 contains the value of $3\times\sigma_{A1}$ (μm) specified by the condition (C) described earlier and the value of $\sigma_{A1}/A_{A1}$ specified by the condition (E) described earlier.

TABLE 1

| Arrangement of holes arranged in first array direction | | | | |
|---|---|---|---|---|
| | $A_{A1}$ (μm) | $\sigma_{A1}$ (μm) | $3 \times \sigma_{A1}$ (μm) | $\sigma_{A1}/A_{A1}$ |
| Example 1 | 99.8 | 0.603 | 1.808 | 0.00604 |
| Example 2 | 124.2 | 1.307 | 3.922 | 0.01053 |
| Example 3 | 163.0 | 2.395 | 7.184 | 0.01470 |
| Example 4 | 119.9 | 2.251 | 6.753 | 0.01877 |
| Example 5 | 118.5 | 2.748 | 8.244 | 0.02320 |
| Example 6 | 160.4 | 1.429 | 4.287 | 0.00891 |
| Example 7 | 90.5 | 1.192 | 3.576 | 0.01317 |
| Comparative Example 1 | 100.0 | 0.008 | 0.024 | 0.00008 |
| Comparative Example 2 | 99.9 | 0.385 | 1.154 | 0.00385 |
| Comparative Example 3 | 118.5 | 9.619 | 28.856 | 0.08119 |
| Comparative Example 4 | 92.8 | 2.966 | 8.899 | 0.03197 |

Similarly, the average (μm) $A_{A2}$ of values of the array pitch $P_{A2}$ of the holes arranged in the second array direction DA2, in which the array pitch of the holes is the second shortest, and the standard deviation $\sigma_{A2}$ (μm) thereof, were measured for each of the decorative sheets according to Examples 1 to 7 and Comparative Examples 1 to 4. The measurement results are shown in Table 2. The value of $3\times\sigma_{A2}$ (μm) specified by the condition (D) described earlier and the value of $\sigma_{A2}/A_{A2}$ specified by the condition (F) described earlier are also contained in Table 2. Moreover, the angle θ(*) formed by the first array direction DA1 and the second array direction DA2 is also contained in Table 2.

TABLE 2

| Arrangement of holes arranged in second array direction | | | | | |
|---|---|---|---|---|---|
| | $A_{A2}$ (μm) | $\sigma_{A2}$ (μm) | $3 \times \sigma_{A2}$ (μm) | $\sigma_{A2}/A_{A2}$ | θ (°) |
| Example 1 | 99.9 | 0.739 | 2.216 | 0.00740 | 60 |
| Example 2 | 130.6 | 1.903 | 5.709 | 0.01457 | 68 |
| Example 3 | 174.0 | 3.103 | 9.309 | 0.01784 | 73 |
| Example 4 | 121.7 | 2.213 | 6.638 | 0.01818 | 90 |
| Example 5 | 121.1 | 2.886 | 8.658 | 0.02384 | 90 |
| Example 6 | 173.5 | 4.212 | 12.635 | 0.02427 | 73 |
| Example 7 | 98.4 | 6.450 | 19.351 | 0.06559 | 83 |
| Comparative Example 1 | 100.0 | 0.009 | 0.026 | 0.00009 | 60 |
| Comparative Example 2 | 100.1 | 0.371 | 1.112 | 0.00370 | 60 |
| Comparative Example 3 | 121.1 | 10.101 | 30.303 | 0.08344 | 90 |
| Comparative Example 4 | 97.8 | 13.420 | 40.260 | 0.13729 | 80 |

Evaluation 1

The decorative sheet according to each example was disposed over the display surface of a display device that is in an entire-screen white display state, and whether a fringe pattern occurs or not was checked. A commercially-available 8-inch liquid crystal display having horizontal 1280 pixels and vertical 720 pixels (horizontally 177 mm and vertically 99 mm, pixel pitch of 138 μm both vertically and horizontally) was used as the display device. The identical display device was used for Examples 1 to 7 and Comparative Examples 1 to 4. The presence/absence of a fringe pattern was evaluated, with the array direction of the holes being parallel to the array direction of the pixels. The evaluation results are shown in the column "Evaluation 1" of Table 3. A symbol "x" entered in the cell indicates that a fringe pattern was observed to an extent of not being tolerable as an actual product. An entry "AA" indicates that no fringe pattern was observed at all even when checked carefully at a viewing distance of 20 cm. An entry "A" indicates that a fringe pattern was observed faintly but to a tolerable degree when checked at a viewing distance of 50 cm, with use conditions of an actual product imagined.

Evaluation 2

The decorative sheet was positioned with respect to the display device in an orientation in which a fringe pattern is least observable, by adjusting the array direction of the holes in relation to the array direction of the pixels. Except for this, the presence/absence of a fringe pattern was evaluated in the same manner as done in Evaluation 1. The evaluation results are shown in the column "Evaluation 2" of Table 3. A symbol "x" entered in the cell indicates that a fringe pattern was observed to an extent of not being tolerable as an actual product. An entry "AA" indicates that no fringe pattern was observed at all even when checked carefully at a viewing distance of 20 cm. An entry "A" indicates that a fringe pattern was observed faintly but to a tolerable degree when checked at a viewing distance of 50 cm, with use conditions of an actual product imagined.

Evaluation 3

The display device was set into a non-display state, and the decorative layer of the decorative sheet was observed from various directions to evaluate the presence/absence of unevenness regarding tone, texture, etc. of the decorative layer. The evaluation results are shown in the column "Evaluation 3" of Table 3. A symbol "x" entered in the cell indicates that unevenness was observed to an extent of not being tolerable as an actual product. An entry "AA" indicates that no unevenness was observed at all even when checked carefully at a viewing distance of 20 cm. An entry "A" indicates that unevenness was observed faintly but to a tolerable degree when checked at a viewing distance of 50 cm, with use conditions of an actual product imagined.

The value of "$3\times\sigma_{A1}$" or "$3\times\sigma_{A2}$", whichever is greater, is entered in the cell under "$3\times\sigma$" of Table 3. The value of "$\sigma_{A1}/A_{A1}$" or "$\sigma_{A2}/A_{A2}$", whichever is less, is entered in the cell under "σ/A" of Table 3. The value of "$|\sigma_{A1}/A_{A1}-\sigma_{A2}/A_{A2}|$" is entered in the cell under "(G) Value" of Table 3. Whether each condition (C) to (G) is met or not is entered in the cell under "Conditions" of Table 3. When the condition is met, "OK" is entered in the cell. When the condition is not met, "NG" is entered in the cell.

In the samples meeting the upper limit of the condition (G), the angular range of the orientation of the decorative sheet with respect to the display device in which the occurrence of a fringe pattern can be suppressed was wide.

TABLE 3

| Evaluation results | | | | | | | | | | | |
|---|---|---|---|---|---|---|---|---|---|---|---|
| | | | | Conditions | | | | | Evaluation results | | |
| | 3 × σ | σ/A | (G) Value | (C) | (D) | (E) | (F) | (G) | Evaluation 1 | Evaluation 2 | Evaluation 3 |
| Example 1 | 2.216 | 0.00604 | 0.001357 | OK | OK | OK | OK | NG | A | A | AA |
| Example 2 | 5.709 | 0.01053 | 0.004040 | OK | OK | OK | OK | NG | A | AA | AA |
| Example 3 | 9.309 | 0.01470 | 0.003143 | OK | OK | OK | OK | NG | A | AA | A |
| Example 4 | 6.753 | 0.01818 | 0.000585 | OK | OK | OK | OK | OK | A | AA | AA |
| Example 5 | 8.658 | 0.02320 | 0.000641 | OK | OK | OK | OK | OK | AA | AA | A |
| Example 6 | 12.635 | 0.00891 | 0.015365 | OK | OK | OK | OK | NG | A | AA | A |
| Example 7 | 19.351 | 0.01317 | 0.052414 | OK | OK | OK | OK | NG | A | AA | A |
| Comparative Example 1 | 0.026 | 0.00008 | 0.000006 | OK | OK | NG | NG | OK | x | x | AA |
| Comparative Example 2 | 1.154 | 0.00370 | 0.000147 | OK | OK | NG | NG | OK | x | x | AA |
| Comparative Example 3 | 30.303 | 0.08119 | 0.002245 | NG | NG | OK | OK | NG | AA | AA | x |
| Comparative Example 4 | 40.260 | 0.03197 | 0.105321 | OK | NG | OK | OK | NG | AA | AA | x |

Evaluation 4

The decorative sheet according to each example was disposed over the display surface of the display device having been used in Evaluation 1, and unevenness in brightness was evaluated. The display device was set into an entire-screen white display state. The evaluation results are shown in the column "Evaluation 4" of Table 4. A symbol "x" entered in the cell indicates that unevenness in brightness was observed to an extent of not being tolerable as an actual product. An entry "AA" indicates that no unevenness in brightness was observed at all even when checked carefully. An entry "A" indicates that unevenness in brightness was observed faintly but to a tolerable degree for use as an actual product.

The average $A_D$ (μm) of values of diameter of the holes and the standard deviation $\sigma_D$ (μm) thereof were measured for each of the decorative sheets according to Examples 1 to 7 and Comparative Examples 1 to 4. The measurement results are shown in Table 4. Whether the condition (H) is met or not is entered in the cell under "Condition" of Table 4. When the condition is met, "OK" is entered in the cell. When the condition is not met, "NG" is entered in the cell.

TABLE 4

| Diameter of hole | | | | | |
|---|---|---|---|---|---|
| | $A_D$ (μm) | $\sigma_D$ (μm) | $\sigma_D$/AD | Condition (H) | Evaluation 4 |
| Example 1 | 59.4 | 1.390 | 0.023 | OK | AA |
| Example 2 | 55.8 | 1.446 | 0.026 | OK | AA |
| Example 3 | 74.5 | 2.038 | 0.027 | OK | AA |
| Example 4 | 49.3 | 2.789 | 0.057 | OK | A |
| Example 5 | 49.1 | 3.284 | 0.067 | OK | A |
| Example 6 | 77.4 | 1.536 | 0.020 | OK | AA |
| Example 7 | 68.0 | 1.877 | 0.028 | OK | AA |
| Comparative Example 1 | 60.0 | 0.005 | 0.000 | OK | AA |
| Comparative Example 2 | 58.0 | 0.927 | 0.016 | OK | AA |
| Comparative Example 3 | 48.1 | 4.179 | 0.087 | NG | x |
| Comparative Example 4 | 69.0 | 2.781 | 0.040 | OK | A |

Evaluation 5

The decorative sheet according to each example was disposed over the display surface of the display device having been used in Evaluation 1, and an image displayed by the display device was observed from various directions to evaluate the clearness of the display image. The display device was set into a display state, and the clearness was checked using various display images. The evaluation results are shown in the column "Evaluation 5" of Table 5. A symbol "x" entered in the cell indicates that the image displayed by the display device was observed to be dark to an extent of not being tolerable as an actual product. An entry "AA" indicates that the display image could be observed very clearly. An entry "A" indicates that the display image could be observed clearly to an extent of being tolerable as an actual product. An entry "A" indicates that the display image could be observed clearly to an extent of being tolerable as an actual product by adjusting the backlight of the liquid crystal display, which is the display device.

Evaluation 6

The display device was set into a non-display state, and the decorative layer of the decorative sheet was observed from various directions to evaluate the sharpness of the design of the decorative layer. The evaluation results are shown in the column "Evaluation 6" of Table 5. A symbol "x" entered in the cell indicates that the design was not sharp to an extent of not being tolerable as an actual product when checked at a viewing distance of 50 cm. An entry "AA" indicates that the design was sharp even when checked carefully at a viewing distance of 20 cm. In a case where the design was sharp to an extent of being tolerable as an actual product when checked at a viewing distance of 50 cm, the sample" was rated "A". In a case where the design was partially not sharp when checked at a viewing distance of 50 cm, the sample" was rated "A".

With regard to Evaluation 5 and Evaluation 6, decorative sheets according to Reference Examples 1 to 4 were also evaluated. The production of Reference Examples 1 to 4 was similar to that of Examples 1 to 7 and Comparative Examples 3 and 4. When the decorative sheets according to Reference Examples 1 to 4 were produced, either the speed of the relative movement of the laminated body with respect to the laser irradiation apparatus or irradiation time intervals of the laser light from the laser irradiation apparatus was, or both were, varied. The degree of hole variation was configured to vary from one decorative sheet to another by differentiating how much the speed/interval is varied among the decorative sheets according to Reference Examples 1 to 4, Examples 1 to 7, and Comparative Examples 3 and 4.

The total luminous transmittance (%) in visible light spectrum and the aperture ratio (%) of each of the decorative sheets according to Examples 1 to 7, Comparative Examples 1 to 4, and Reference Examples 1 to 4 were measured using the measurement method described above. The measurement results are shown in Table 5.

TABLE 5

Transmittance and aperture ratio of decorative sheet

| | Visible light transmittance (%) | Aperture ratio (%) | Evaluation 5 | Evaluation 6 |
|---|---|---|---|---|
| Example 1 | 22.1 | 32.1 | AA | AA |
| Example 2 | 10.4 | 16.2 | AA | AA |
| Example 3 | 11.5 | 16.1 | AA | AA |
| Example 4 | 8.8 | 13.1 | A | AA |
| Example 5 | 8.7 | 13.2 | A | AA |
| Example 6 | 13.0 | 17.7 | AA | AA |
| Example 7 | 30.3 | 41.0 | AA | A |
| Comparative Example 1 | 22.5 | 32.6 | AA | AA |
| Comparative Example 2 | 21.7 | 30.5 | AA | AA |
| Comparative Example 3 | 8.7 | 12.7 | A | AA |
| Comparative Example 4 | 32.0 | 41.8 | AA | A |
| Reference Example 1 | 3.1 | 5.1 | Δ | AA |
| Reference Example 2 | 0.8 | 1.7 | x | AA |
| Reference Example 3 | 35.9 | 47.1 | AA | Δ |
| Reference Example 4 | 40.1 | 50.2 | AA | x |

REFERENCE SIGNS LIST

1 decorative-sheet-attached display device
10 display device
12 surface light source device
20 decorative sheet
22 hole
25 substrate
25A film material
30 decorative layer
30A decorative portion
30B transmissive portion
31 laminated body
32 design layer
32A base design layer
34 light shielding layer
34A base light shielding layer
50 sheet article
50R roll
51 width-directional edge
80 decorative sheet manufacturing apparatus
85 transportation unit
90 control unit
100 laser irradiation apparatus

The invention claimed is:

1. A decorative sheet, comprising:

a decorative layer that visually presents a design, wherein holes arranged in a plurality of directions are provided in the decorative layer, an average $A_{A1}$ of values of an array pitch of the holes arranged in a first array direction, in which said average of the values of the array pitch of the holes is a least value among the plurality of directions, is 40 μm or greater and 400 μm or less, a value obtained by multiplying, by three, a standard deviation GAI of the array pitch of the holes arranged in the first array direction is 7 μm or less, a ratio of the standard deviation $\sigma_{A1}$, in μm, to the average $A_{A1}$, in μm, is 0.0060 or greater, an average $A_{A2}$ of values of an array pitch of the holes arranged in a second array direction, in which said average of the values of the array pitch of the holes is a second least value among the plurality of directions, is 40 μm or greater and 400 μm or less, a value obtained by multiplying, by three, a standard deviation $\sigma_{A2}$ of the array pitch of the holes arranged in the second array direction is 7 μm or less, and a ratio of the standard deviation $\sigma_{A2}$, in μm, to the average $A_{A2}$, in μm, is 0.0060 or greater.

2. The decorative sheet according to claim 1, wherein a ratio, to an average $A_D$, in μm, of values of a diameter of the holes provided in the decorative layer, of a standard deviation $\sigma_D$, in μm, of the diameter of the holes is 0.080 or less.

3. The decorative sheet according to claim 1, wherein the average $A_{A1}$, μm, of the values of the array pitch of the holes arranged in the first array direction and the standard deviation $\sigma_{A1}$, in μm, thereof and the average $A_{A2}$, in μm, of the values of the array pitch of the holes arranged in the second array direction and the standard deviation $\sigma_{A2}$, in μm, thereof meet a condition of $|\sigma_{A1}/A_{A1}-\sigma_{A2}/A_{A2})\leq 0.0010$.

4. The decorative sheet according to claim 1, wherein the decorative layer includes a design layer that visually presents the design and a light shielding layer stacked with the design layer.

5. The decorative sheet according to claim 4, further comprising:

a substrate stacked with the decorative layer, wherein the light shielding layer is located between the substrate and the design layer, and a width of the hole at a base end located closer to the substrate is less than a width of the hole at a distal end located farther from the substrate.

6. The decorative sheet according to claim 1, wherein an average $A_D$ of values of the diameter of the holes provided in the decorative layer is 20 μm or greater and 200 μm or less.

7. The decorative sheet according to claim 1, wherein an aperture ratio of the decorative layer is 5% or greater and 50% or less.

8. The decorative sheet according to claim 1, wherein a total luminous transmittance is 3% or greater and 40% or less.

9. The decorative sheet according to claim 1, wherein the decorative layer includes one or more selected from the group consisting of wood, natural fiber, natural leather, natural stone, synthetic fiber, synthetic leather, and artificial stone.

10. A decorative-sheet-attached display device, comprising:

a display device; and the decorative sheet according to claim 1, said decorative sheet being disposed to be stacked with the display device.

11. The decorative-sheet-attached display device according to claim 10, wherein an array pitch of pixels included in the display device for displaying a same color is 40 μm or greater and 500 μm or less.

12. The decorative sheet according to claim 1, wherein the value obtained by multiplying, by three, the standard deviation $\sigma_{A1}$ of the array pitch of the holes arranged in the first array direction is 5 μm or less, and the value obtained by multiplying, by three, the standard deviation $\sigma_{A2}$ of the array pitch of the holes arranged in the second array direction is 5 μm or less.

13. A sheet article, comprising:

a plurality of decorative sheets each being the decorative sheet according to claim 1.

14. The sheet article according to claim 13, wherein the first array direction of the decorative sheet is inclined with respect to a length direction of the sheet article, and the second array direction of the decorative sheet is inclined with respect to the length direction of the sheet article.

15. The sheet article according to claim 13, said sheet article being wrapped around a roll axis, wherein the first array direction of the decorative sheet is inclined with respect to the roll axis, and the second array direction of the decorative sheet is inclined with respect to the roll axis.

* * * * *